US012368237B2

(12) United States Patent
Holmes et al.

(10) Patent No.: US 12,368,237 B2
(45) **Date of Patent: *Jul. 22, 2025**

(54) MECHANICAL ACTUATORS FOR A WIRELESS TELECOMMUNICATION ANTENNA MOUNT

(71) Applicant: Radiarc Technologies, LLC, Wakefield, MA (US)

(72) Inventors: Stephen J. Holmes, Revere, MA (US); Arthur P. Clifford, Gloucester, MA (US)

(73) Assignee: Radiarc Technologies, LLC, Wakefield, MA (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/838,715

(22) Filed: Jun. 13, 2022

(65) Prior Publication Data

US 2022/0376388 A1 Nov. 24, 2022

Related U.S. Application Data

(63) Continuation-in-part of application No. 17/315,232, filed on May 7, 2021, now Pat. No. 11,450,940, (Continued)

(51) Int. Cl.

| | |
|---|---|
| ***H01Q 3/08*** | (2006.01) |
| ***H01Q 1/12*** | (2006.01) |
| ***H01Q 1/24*** | (2006.01) |
| ***H01Q 3/00*** | (2006.01) |

(52) U.S. Cl.

CPC ............ *H01Q 3/08* (2013.01); *H01Q 1/1228* (2013.01); *H01Q 1/125* (2013.01); *H01Q 1/246* (2013.01); *H01Q 3/005* (2013.01)

(58) Field of Classification Search

CPC ........... H01Q 3/005; H01Q 3/02; H01Q 3/04; H01Q 3/06; H01Q 3/08; H01Q 1/1228; H01Q 1/246; H04W 16/28

See application file for complete search history.

(56) References Cited

U.S. PATENT DOCUMENTS

| | | | |
|---|---|---|---|
| 9,306,278 | B2 | 4/2016 | Lever et al. |
| 10,511,090 | B2 | 12/2019 | Clifford et al. |

(Continued)

FOREIGN PATENT DOCUMENTS

| | | | | |
|---|---|---|---|---|
| CN | 1937803 A | | 3/2007 | |
| CN | 109473783 A | * | 3/2019 | ............ H01Q 3/005 |

(Continued)

OTHER PUBLICATIONS

Gemintek—RET Solution Expert, "Precisian AISG Device Manager", Gemintek Corporation, 5F-1, No. 8, Alley 30, Lane 358, Ruiguang Road, Neihu, Taipei, Taiwan, http:www.gemintek.com.tw.

*Primary Examiner* — Daniel Munoz

(74) *Attorney, Agent, or Firm* — Hinckley Allen; Stephen Holmes

(57) ABSTRACT

A remotely controllable antenna mount for use with a wireless telecommunication antenna provides both mechanical azimuth and mechanical tilt adjustment using AISG compatible motor control units and AISG control and monitoring systems to remotely adjust the physical orientation of the antenna. The mount control units are serially interconnected with existing AISG antenna control units (ACU's) which adjust internal electronic tilt of the antenna. The present solution provides the ability to both physically aim the antenna to adjust coverage area and also adjust the signal phase to fine tune the quality of the signal.

21 Claims, 36 Drawing Sheets

Related U.S. Application Data which is a continuation-in-part of application No. 17/183,151, filed on Feb. 23, 2021, now Pat. No. 11,539,127, which is a continuation of application No. 16/315,229, filed as application No. PCT/US2017/041586 on Jul. 11, 2017, now Pat. No. 10,944,169, which is a continuation-in-part of application No. 15/207,159, filed on Jul. 11, 2016, now Pat. No. 10,511,090.

(60) Provisional application No. 63/210,369, filed on Jun. 14, 2021, provisional application No. 63/157,859, filed on Mar. 8, 2021, provisional application No. 63/021,881, filed on May 8, 2020, provisional application No. 62/383,647, filed on Sep. 6, 2016.

(56) References Cited

U.S. PATENT DOCUMENTS

| | | | |
|---|---|---|---|
| 2003/0160731 | A1 | 8/2003 | Wensink |
| 2007/0241979 | A1 | 10/2007 | Yang |
| 2007/0290935 | A1 | 12/2007 | Franzon et al. |
| 2008/0036670 | A1 | 2/2008 | Arvidsson et al. |
| 2009/0135074 | A1 | 5/2009 | Yang et al. |
| 2010/0231450 | A1 | 9/2010 | Le Sage |
| 2012/0062356 | A1 | 3/2012 | Mann et al. |
| 2015/0144758 | A1 | 5/2015 | Kolokotronis |
| 2016/0211576 | A1 | 7/2016 | Vassilakis |
| 2016/0240910 | A1 | 8/2016 | Balter et al. |
| 2017/0040682 | A1 | 2/2017 | Lee et al. |
| 2017/0289323 | A1 | 10/2017 | Gelvin et al. |
| 2018/0159199 | A1 | 6/2018 | Kolokotronis |
| 2019/0372686 | A1 | 12/2019 | Patel |
| 2020/0194884 | A1 | 6/2020 | Clifford et al. |
| 2021/0328342 | A1 | 10/2021 | Clifford et al. |

FOREIGN PATENT DOCUMENTS

| | | | |
|---|---|---|---|
| CN | 209133694 | U | 7/2019 |
| EP | 2424040 | A1 | 2/2012 |
| WO | 2011140794 | A1 | 11/2011 |
| WO | 2018013602 | A2 | 1/2018 |

* cited by examiner

MECHANICAL ACTUATORS FOR A WIRELESS TELECOMMUNICATION ANTENNA MOUNT

BACKGROUND OF THE INVENTION

Field of the Invention

The instant invention relates to wireless telecommunication (T/C) systems. More specifically, the invention relates to a wireless T/C antenna mounts and their methods of operation.

Description of Related Art

Over the last 20 years, the use of cellular phones as a primary means of communication has exploded worldwide. In order to provide coverage area and bandwidth for the millions of cell phones in use, there has also been a huge increase in the number of T/C transmitter/receiver antenna installations (T/C installations) and the number of T/C transmitter/receiver antennas (antennas) mounted on those T/C installations. In most cases, the antennas are mounted on towers, monopoles, smokestacks, buildings, poles or other high structures to provide good signal propagation and coverage. There are literally hundreds of thousands of T/C installations in the U.S., with each installation carrying multiple antennas from multiple carriers.

Referring to FIGS. 1-3, each tower or installation 10 has an associated base station 12, which includes power supplies, radio equipment, interfaces with conventional wire and/or fiber optic T/C system nodes 14, microwave links, etc. The base station node(s) 14, in turn, have a wireless or wired connection to each carrier's Network Operations Center (NOC) 16 to monitor and control the transmission of T/C signals to and from the antennas 18 and over the carrier's network.

At each tower installation, each carrier may typically have three separate antennas 18 oriented 120° apart to serve three operational sectors of its service area. Some installations may also have multiple different antennas in each sector transmitting and receiving separate communication bandwidths. However, it should be noted that many other types of installations may have only a single antenna 18. For example, antennas 18 mounted on the sides of building are typically pointed in a single direction to provide coverage in a particular direction, i.e. towards a highway.

Other types of installations may include directional microwave antennas for site to site communication.

Each antenna 18 is typically mounted on a vertical pole 20 using a clamped mount 22 having some ability to manually adjust the orientation (azimuth and tilt) of the antenna 18 relative to the desired service area. Typical manual adjustment of tilt, or downtilt position (angular direction around a horizontal pivot axis) involves manually tilting the antenna 18 downward using a mechanical downtilt bracket 21 (usually provided as part of the mount or antenna) and rigidly clamping or tightening the tilt bracket 21 in the desired position (FIGS. 2A and 2B). Typical manual adjustment of an azimuth position (angular direction around a vertical axis) involves manually rotating the mount 21 around the vertical pole 20 and physically clamping the mount 21 in the desired rotational position relative to the pole 20 (FIGS. 2C and 2D). The fixed mounting positions are not typically moved unless absolutely necessary.

When a carrier designs a service coverage area, they will specify the desired azimuth and tilt angles of the antennas 18 that they believe will provide the best service coverage area for that installation 10. Antenna installers will climb the tower or building and install the antennas 18 to the provider's specifications and orientation (azimuth and mechanical tilt). Operational testing is completed and the antenna mounts 21 are physically clamped down into final fixed positions. However, various environmental factors often affect the operation of the antennas 18, and adjustments are often necessary. RF interference, construction of new buildings in the area, tree growth, ground settlement, high wind, vibration, etc. are all issues that affect the operation of an antenna 18. Additionally, the growth of surrounding population areas often increases or shifts signal traffic within a service area requiring adjustments to the RF service design for a particular installation. Further adjustment of the antennas 18 involves sending a maintenance team back to the site to again climb the tower or building and manually adjust the physical orientation of the antenna(s) 18. As can be appreciated, climbing towers and buildings is a dangerous job and creates a tremendous expense for the carriers to make repeated adjustments to coverage area as well as a tremendous risk for the tower climbers.

As a partial solution to adjusting the vertical downtilt of an antenna 18, some antennas may include an internal "electrical" tilt adjustment which electrically shifts the signal phase of internal elements (not shown) of the antenna 18 to thereby adjust the tilt angle of the signal lobe (and in some cases reduce sidelobe overlap with other antennas) without manually adjusting the physical azimuth or tilt positions of the antenna 18. This internal tilt adjustment is accomplished by mounting internal antenna elements on a movable backplane and adjusting the backplane with an antenna control unit (ACU) 24 which are integrated and controlled through a standard antenna power and interface protocol known as AISG (Antenna Interface Standards Group). Referring to FIG. 3, the antennas 18 are connected to the local node through amplifiers 26 (TMA—tower mounted amplifiers). A local CNI (control network interface) 28 controls the TMAs 26 and ACUs 24 by mixing the AISG control signal with the RF signal through bias T connectors 30. Each carrier uses the AISG protocols to monitor and control various components within the T/C system from antenna to ground. Antenna maintenance crews can control the electrical tilt of the antennas 18 from the local CNI 28 at the base station 12 and, more importantly, the carrier NOC 16 has the ability to see the various components in the signal path (antenna line devices or ALD's) and to monitor and control operation through the AISG protocols and software.

While this limited phase shift control (electrical downtilt) is somewhat effective at adjusting the coverage area, it is not a complete solution since adjustment of the signal phase of the internal antenna elements often comes at the expense of signal strength and interference of the backward facing transmission lobe with other tower structure and components. In other words, shifting the signal phase provides the limited ability to finitely adjust the coverage area without physically moving the antenna 18, but at the same time may significantly degrade the strength of the signal being transmitted or received. Reduced signal strength means dropped calls and reduced bandwidth (poor service coverage). This major drawback is no longer acceptable in T/C systems that are being pushed to their limits by more and more devices and more and more bandwidth requirements.

Currently, there is no remote ability to change or adjust the physical orientation of the entire antenna.

SUMMARY OF THE INVENTION

Cellular carriers and RF designers have become overly reliant on the internal signal phase adjustments to adjust coverage area to the extent that they are seriously degrading signal quality at the expense of a perceived increase in coverage area or perceived reduction in interference.

A remotely controllable antenna mount for use with a wireless telecommunication antenna provides both mechanical azimuth (bearing) and mechanical tilt adjustment using AISG compatible motor control units and AISG control and monitoring systems to remotely adjust the physical orientation of the antenna. The mount control units may be serially interconnected with existing AISG antenna control units (ACU's) which adjust internal electronic tilt of the antenna. Or the present mount system may be used as a standalone remote position system. When used together with internal RET capable antennas, present solution provides the ability to both physically aim the antenna to adjust coverage area and also adjust the signal phase to fine tune the quality of the signal.

An exemplary embodiment of the present antenna mount includes a structure side interface and an antenna side interface which are rotatable relative to each other through upper and lower pivots aligned along a vertical axis. The pivots provide rotatable movement about the vertical axis through a range of azimuth angle positions. An AISG compatible mount azimuth control unit (MACU) has a motor mounted on the structure side interface to drive rotatable movement of the antenna through a range of azimuth (bearing) angle positions. The exemplary embodiment of the antenna mount further includes a mechanical downtilt assembly mechanically interconnected between the antenna interface and the antenna. The mechanical downtilt assembly includes a lower hinge connector connected between a lower portion of the antenna interface and a lower portion of the antenna where the lower hinge connector is pivotable about a horizontal axis. The mechanical downtilt assembly further includes a linear actuator drive connected between an upper portion of the antenna interface and an upper portion of the antenna where the linear actuator is linearly extendable to pivot the antenna about the lower hinge connector through a range of tilt angle positions.

The antenna interface includes an antenna mounting mast rotatably connected to the structure side interface. The antenna is mounted to the linear mast and rotation of the mast is driven by the azimuth control unit.

Operational methods of the control system include selectively controlling either or both of the MACU and the MTCU to physically orient the antenna and may also include controlling an internal ACU to adjust the electrical downtilt through a common interface where configured as such.

Accordingly, there is provided a unique and novel antenna mount and control configuration which is highly desirable for easy adjustment of antenna coverage, which reduces costs of tower visits, and which reduces the liability of tower climbing crews for manual adjustment of antenna orientation.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Generally, a remotely controllable antenna mount as indicated at 600/700/800/1000/2000 in the various figures is particularly useful with a wireless telecommunication antenna 102 (FIGS. 6-7) to provide mechanical azimuth and/or mechanical tilt adjustment using AISG compatible motor control units and AISG control and monitoring systems to remotely adjust the physical orientation of the antenna 102.

Antenna 102 may comprise any commercially available telecommunication antenna from any carrier, operating over any communication bandwidth and may also comprise microwave antennas or other such directional antennas. The antenna generally comprises a housing 102A and rearwardly facing upper and lower connection brackets 102B, which have a horizontal hinge connection 102C. The antenna connection brackets 102B generally have a standard spacing, but there is significant variation from each manufacturer depending on the antenna size and configuration. For ease of description, an exemplary antenna 102 may comprise a single band antenna and may have a single Antenna Control Unit (ACU) 104 controllable from the local base station 12 and/or carrier NOC 16. Other T/C antenna or microwave antennas may not include any internal ACU's and in such a case, the present invention may be used as a standalone positioning device for physical positioning and orientation of the antenna 102.

As will be described further hereinbelow, the mount AISG control units 171/192 may be serially interconnected with AISG antenna control unit(s) (ACUs) 104 which adjust internal electronic tilt of the antenna 102. The present invention therefore provides the ability to physically aim or position the antenna (antenna housing) to adjust coverage area in addition to internally adjusting the signal phase to fine tune the quality of the signal through the same power and control infrastructure.

Figure 4:
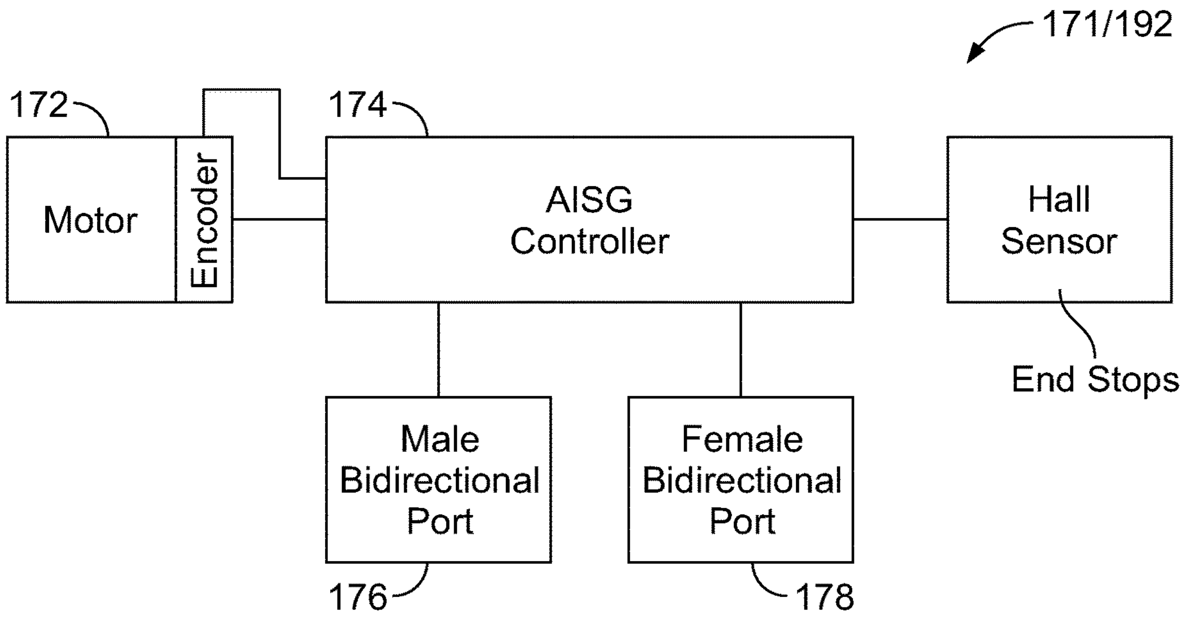
FIG. 4 is a schematic illustration of an exemplary motor control unit.

Referring to FIG. 4, an exemplary motor control unit 171 is illustrated. In some embodiments this motor control unit 171 may be a control unit that comprises a motor 172, an AISG motor control processor 174, a position sensor 175 and male 176 and female 178 AISG bidirectional ports. The bidirectional ports allow these control units to be serially interconnected and monitored and controlled as a single system. In some embodiment which are not required to drive a significant weight, these may be similar to the ACU units 104 which are installed on the antenna 102 to control the internal antenna signal phase. As will be described in later embodiments, heavier antennas may require more robust drive systems including larger motors and higher gear ratios for improved torque and rotational stability under wind load. In either case, the AISG motor control systems allow the units to be operated and controlled with the same software and interfaces which may already be in place at the local Node 14 and/or the carrier NOC 16.

Figure 1:
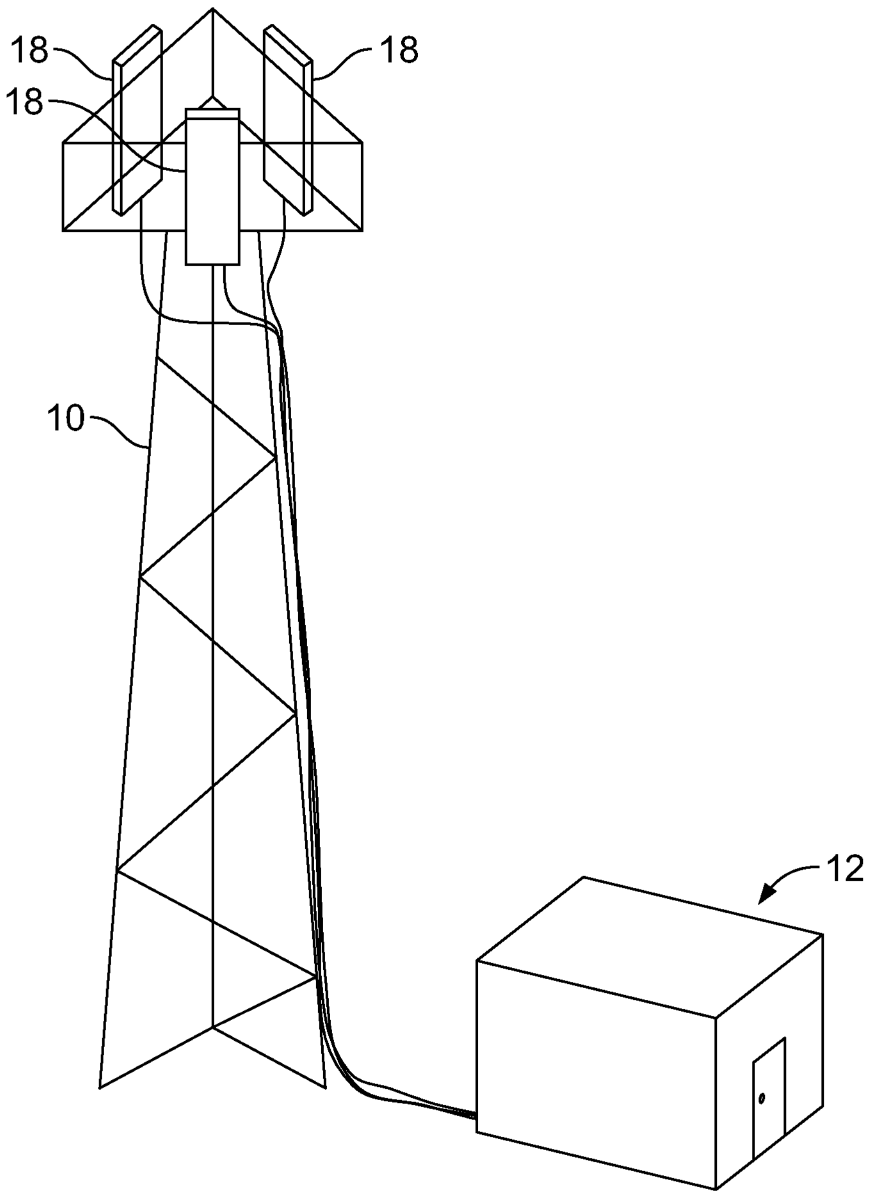
FIG. 1 (PRIOR ART)
FIG. 1 is a schematic illustration of a telecommunication tower installation.
Figure 2A:
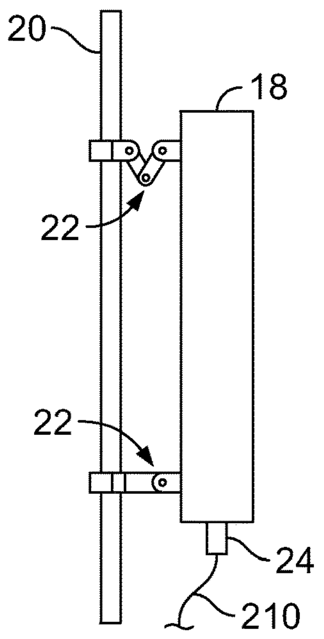
FIG. 2A (PRIOR ART)
FIG. 2A is an illustration of a prior art antenna and mount including a manual downtilt bracket installed on a mount post.
Figure 2B:
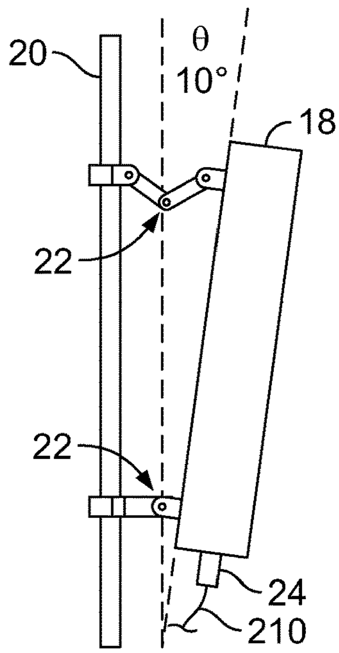
FIG. 2B (PRIOR ART)
FIG. 2B is a similar illustration thereof with the downtilt bracket extended.
Figure 2C:
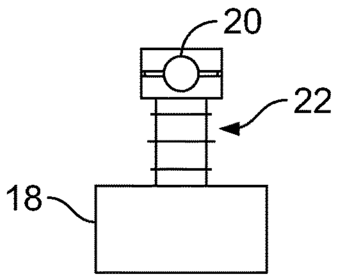
FIG. 2C (PRIOR ART)
FIG. 2C is a top illustration thereof showing the mount bracket and antenna clamped at a 0° azimuth position.
Figure 2D:
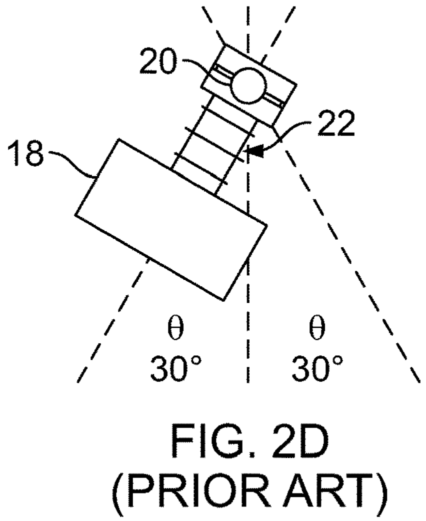
FIG. 2D (PRIOR ART)
FIG. 2D is another top illustration thereof showing the mount brackets and antenna clamped at a 30° azimuth position.
Figure 3:
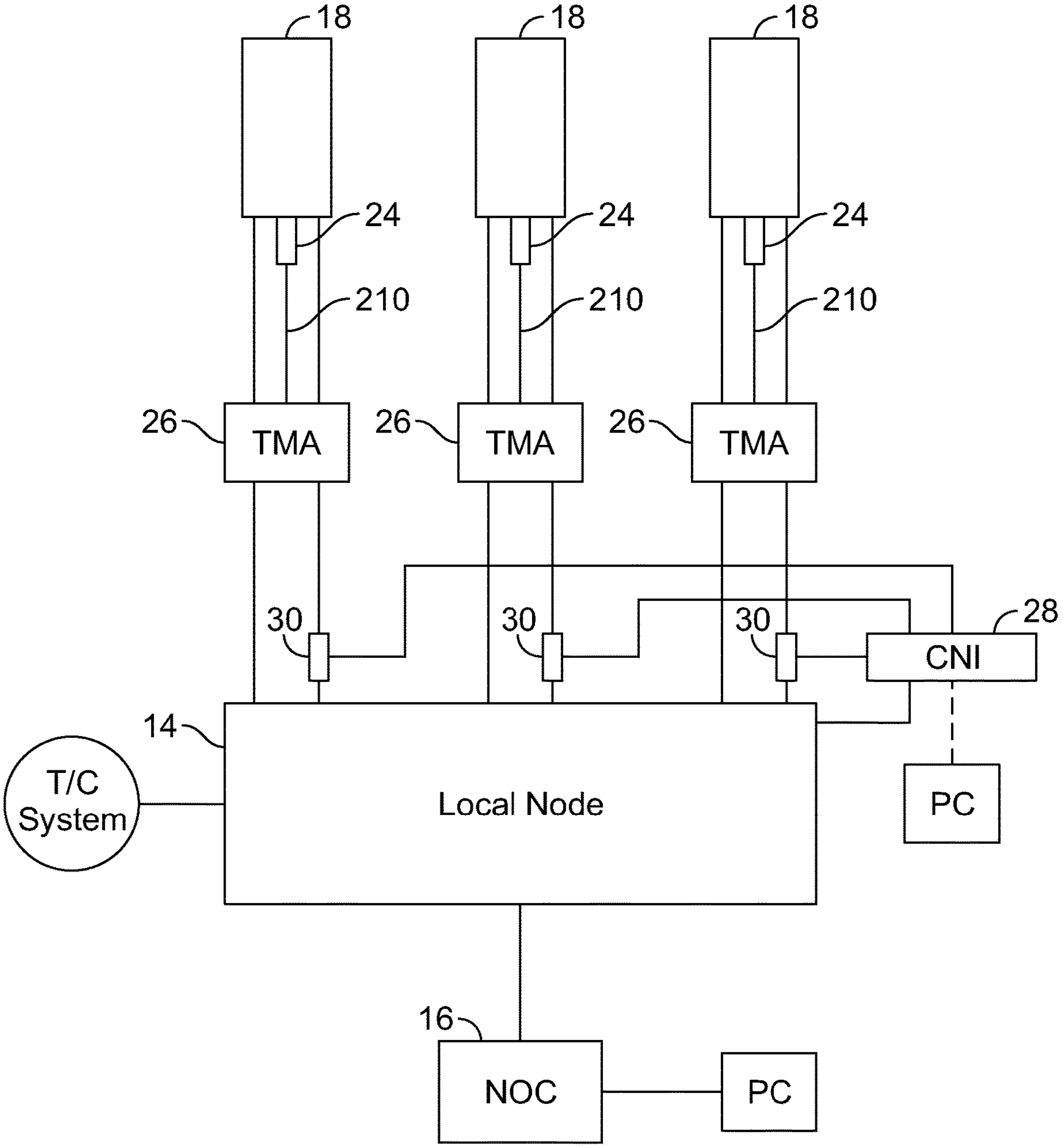
FIG. 3 (PRIOR ART)
FIG. 3 is a schematic view of a prior art AISG compatible tower installation.
Figure 5:
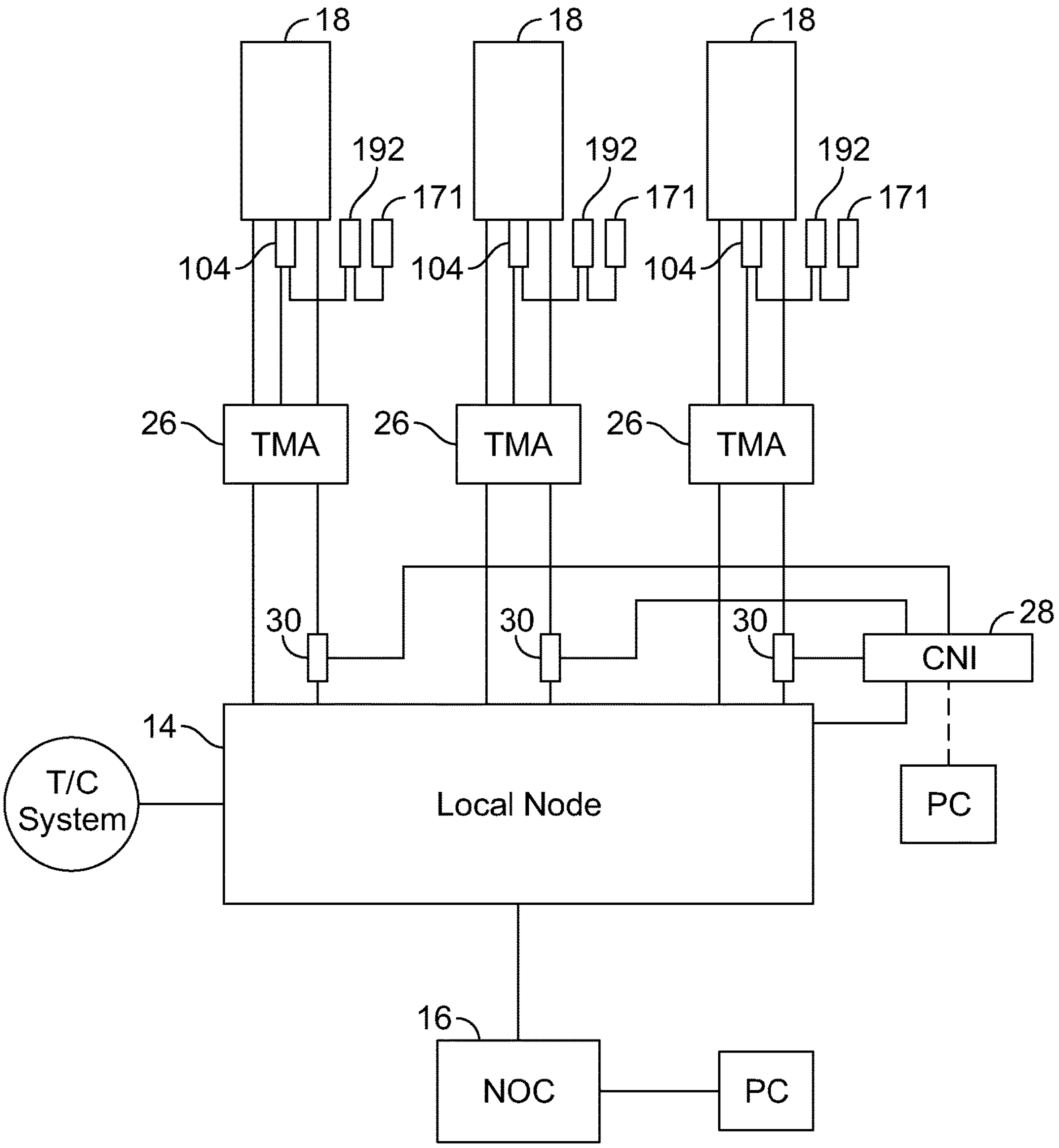
FIG. 5 is a schematic view of an AISG tower installation including 3 antennas and antenna mounts according to the present invention.

Referring to FIG. 5, an exemplary T/C system is illustrated. Building on the prior art system of FIG. 3, the present improved system may include a plurality of antennas 102, and each may (or may not) have at least one on-board ACU 104. The ACU's 104 are connected to, and can be controlled from, the local CNI 28 and the NOC 16 as previously described. According to the teachings of the present invention, an external Mount Azimuth Control Unit (MACU) 171 and the Mount Tilt Control Unit (MTCU) 192 may be serially connected with the ACU 104 with AISG serial cables 210 to provide serial control of all of the control units 104, 171, 192 through the existing AISG infrastructure. In this regard, the antenna installed control unit(s) 104 will control "electronic tilt" of the antenna, while the MACU and MTCU will control the "physical" position of the entire antenna. The present solution thus provides the ability to both physically aim the antenna to adjust coverage area (MACU and MTCU) and also the ability to adjust the signal phase to fine tune the quality of the signal (ACU).

Alternatively, the control units 171/192 may be connected directly to the local node 14 for standalone positioning of the antenna 102.

Figure 6:
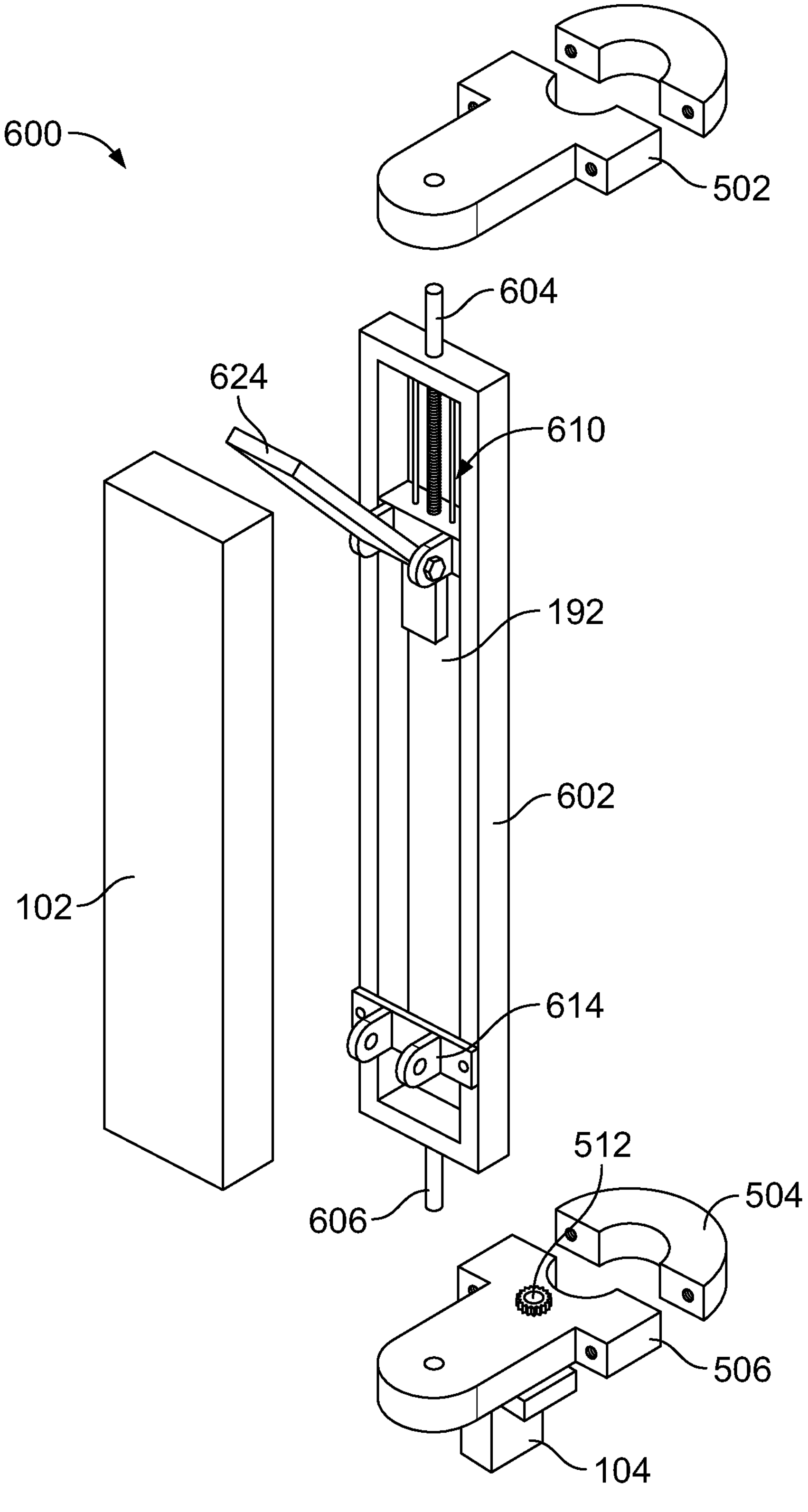
FIG. 6 is an exploded view of yet another exemplary embodiment with an improved back frame and linear drive assembly.
Figure 7:
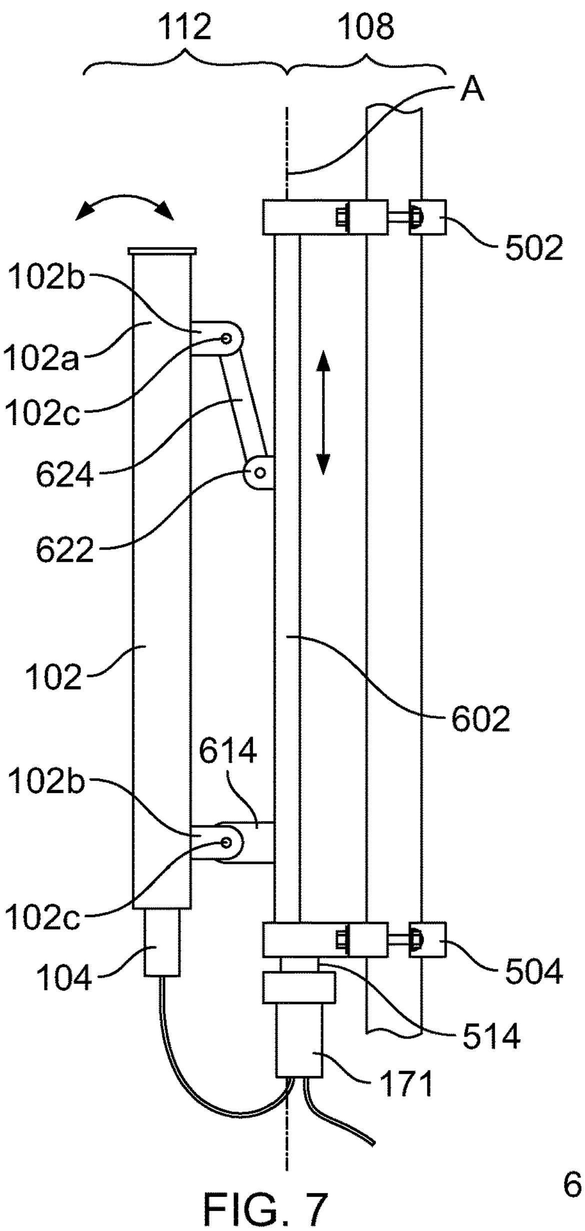
FIG. 7 is a side view thereof.
Figure 8:
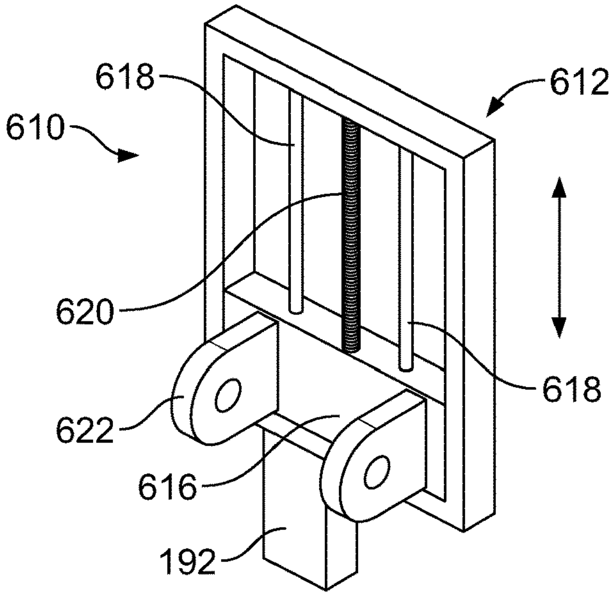
FIG. 8 is an enlarged view of an exemplary linear tilt drive sub-assembly.

Referring to FIGS. 6-8), an exemplary embodiment of the present antenna mount may include an azimuth (bearing) adjustment assembly generally having a structure side interface 108 which is configured to be mounted to a mounting pole 20 or other structure, and an antenna side interface 112 which is configured to be mounted to the antenna 102. As indicated above, many antennas 102 are mounted on towers and monopole structures which provide a vertical pole 20 for mounting of the antenna 102. While the exemplary embodiments described herein are intended for mounting on a pole structure 20, the scope of the invention should not be limited by these illustrations. The structure side interface 108 can be adapted and modified as needed to be secured to many different types of structures, and could include brackets, connectors, magnets, etc. as needed for flat surfaces, curved surfaces, etc.

Figure 12:
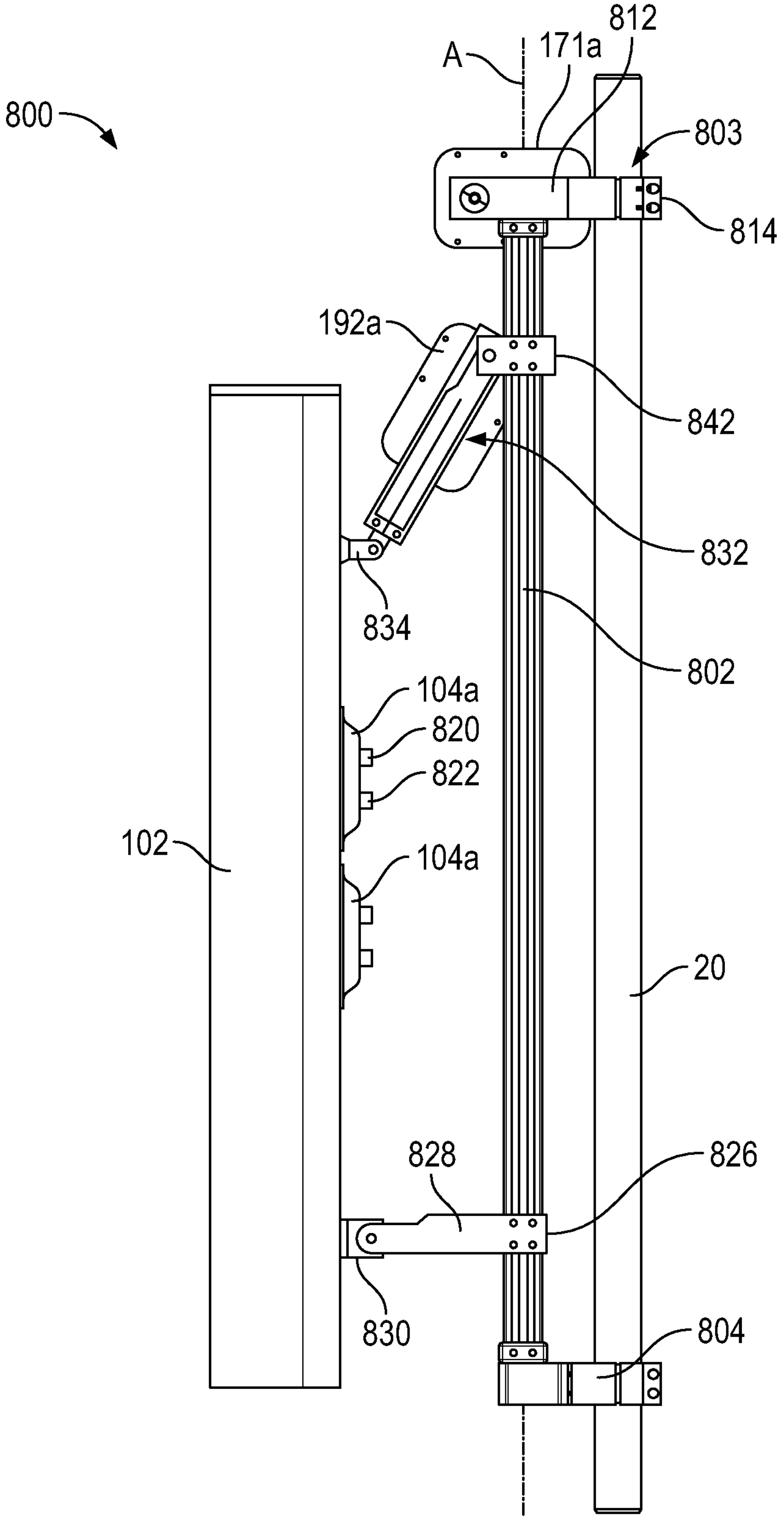
FIG. 12 is a side view thereof.
Figure 13:
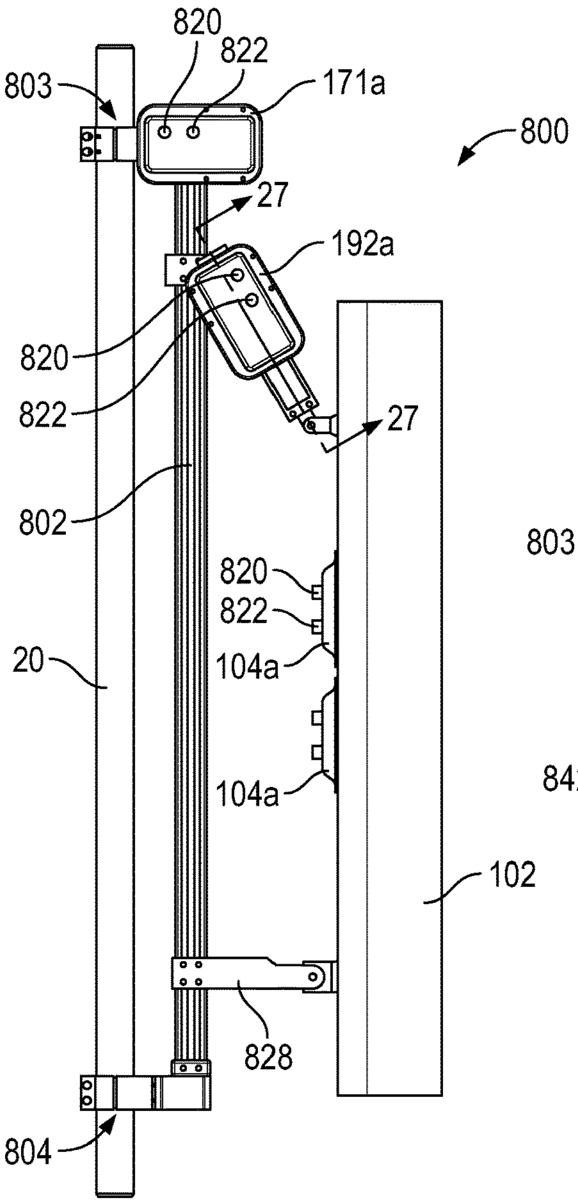
FIGS. 13-14 are additional side views showing the antenna in a full upright position and a mechanically actuated 15 degree downtilt position.
Figure 14:
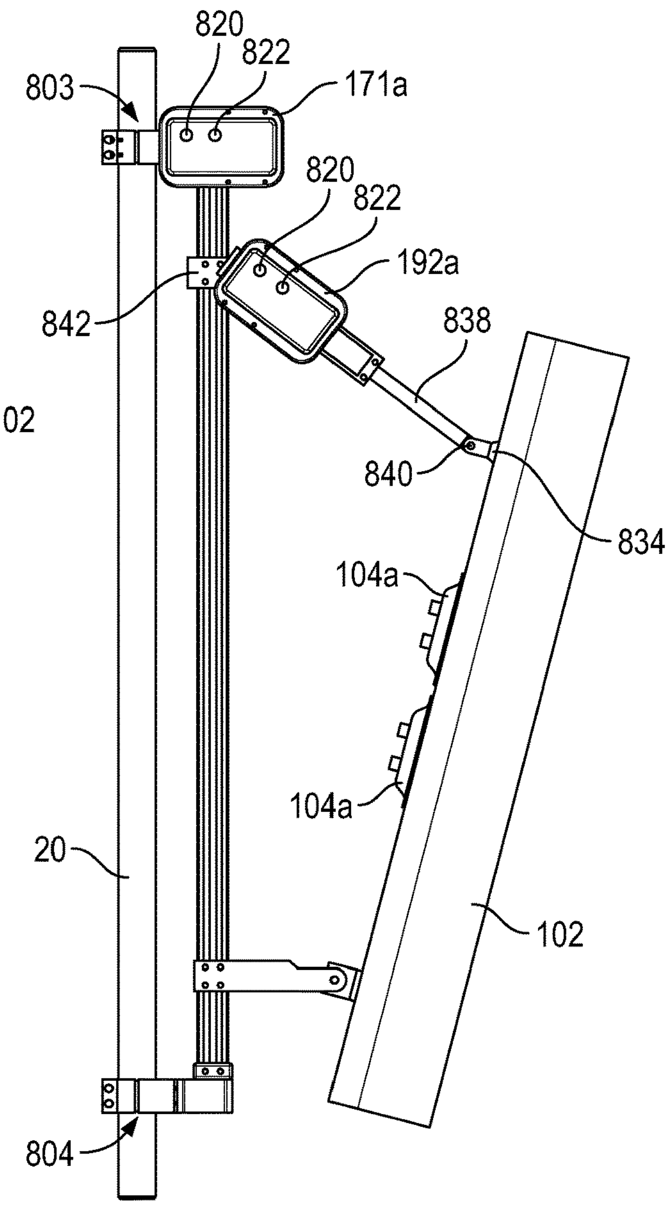
Figure 15:
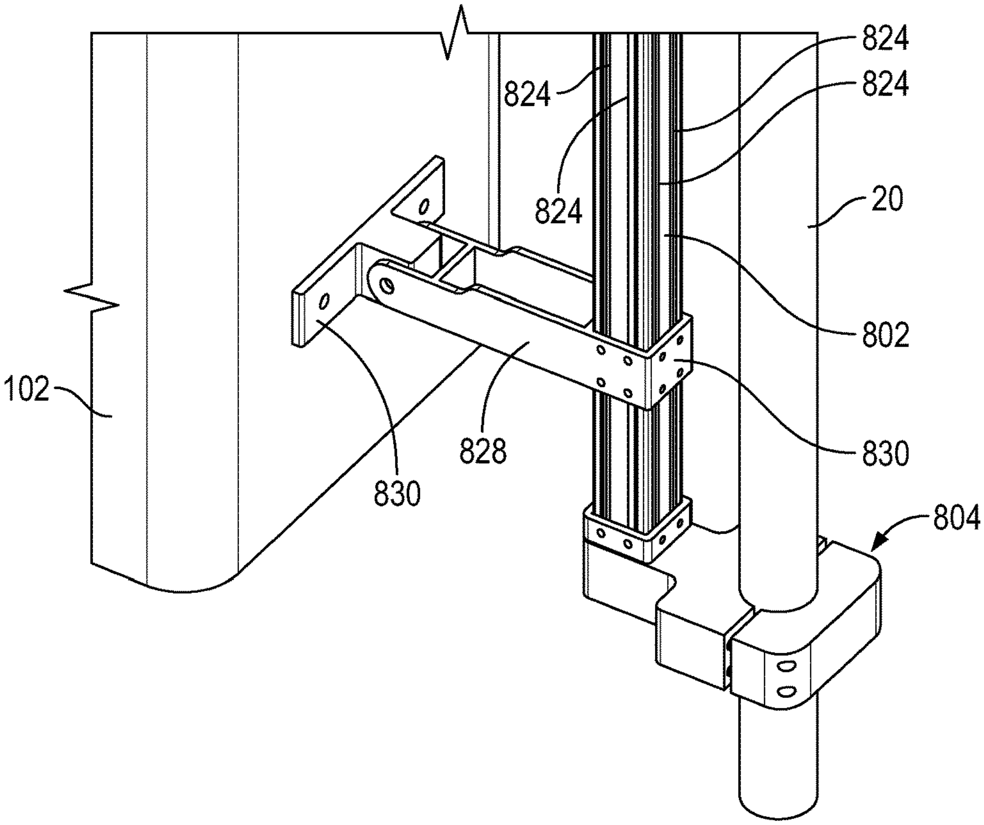
FIG. 15 is an enlarged perspective view of the lower rotation bracket, mast and lower downtilt pivot bracket.
Figure 16:
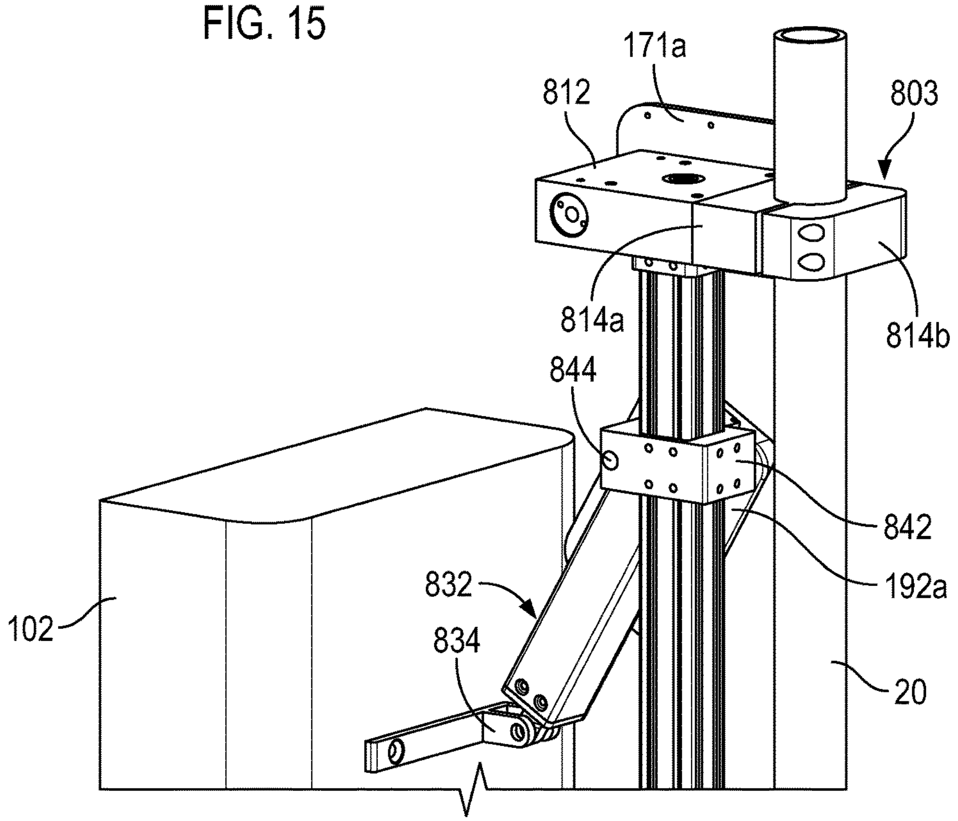
FIG. 16 is an enlarged perspective view of the gear reduction drive for azimuth rotation, mounting bracket and the linear actuator drive for downtilt pivotably secured to the mast and upper portion of the antenna.
Figure 17:
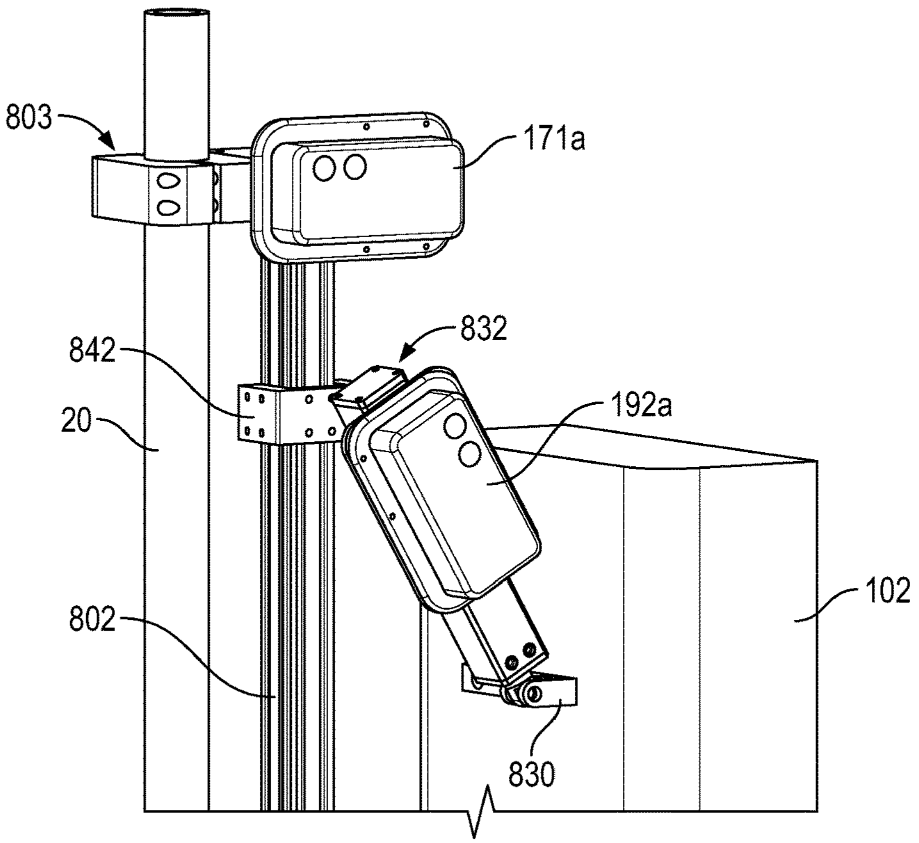
FIG. 17 is an enlarged perspective view thereof from another angle.
Figure 18:
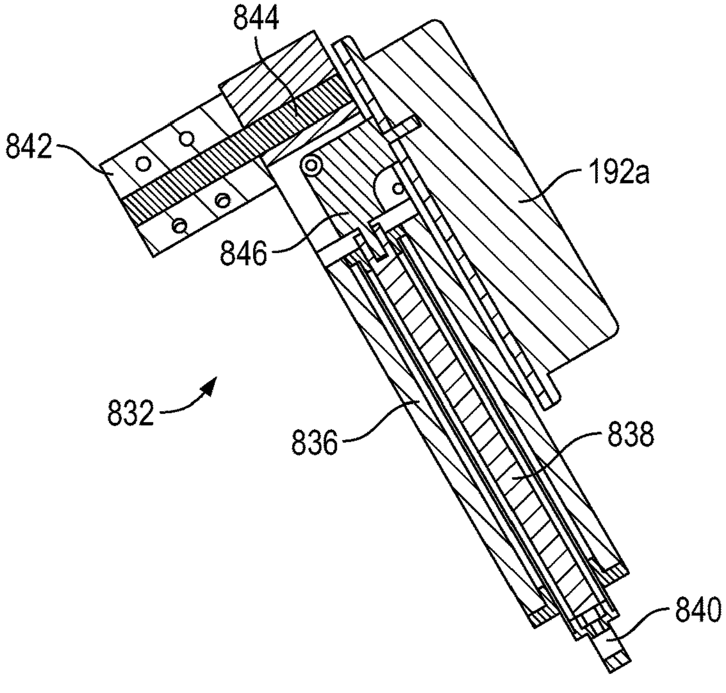
FIG. 18 is a cross-sectional view of the linear drive rod, MTCU motor controller, right angle drive coupling and mast bracket.
Figure 19:
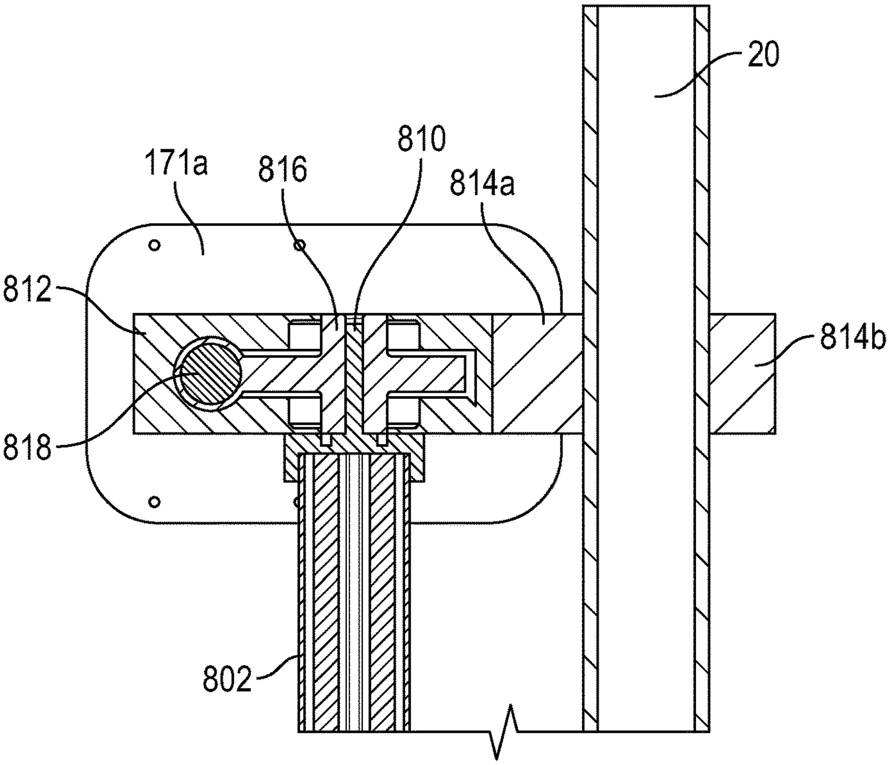
FIGS. 19 and 20 are cross-sectional views thereof taken along line 19-19 and 20-20 of FIG. 11.
Figure 20:
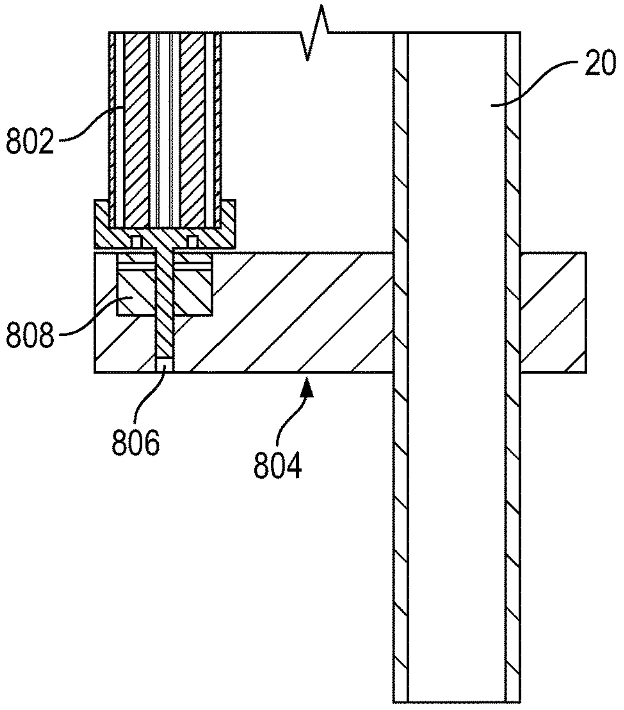
Figure 21:
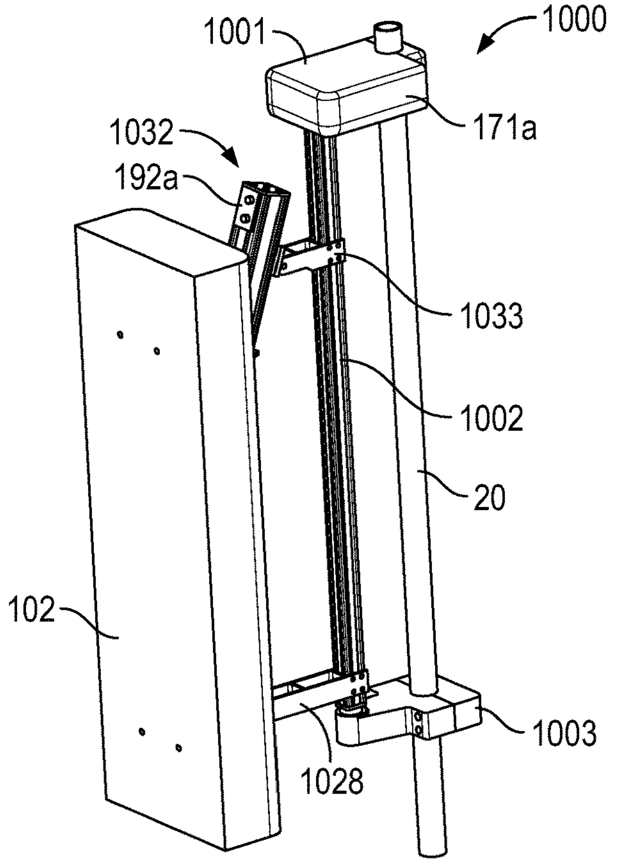
FIGS. 21-33 illustrate another embodiment with the azimuth rotation system and clamp mount integrated into a single drive unit and the linear actuator drive fully self-contained within a tubular housing.
Figure 22:
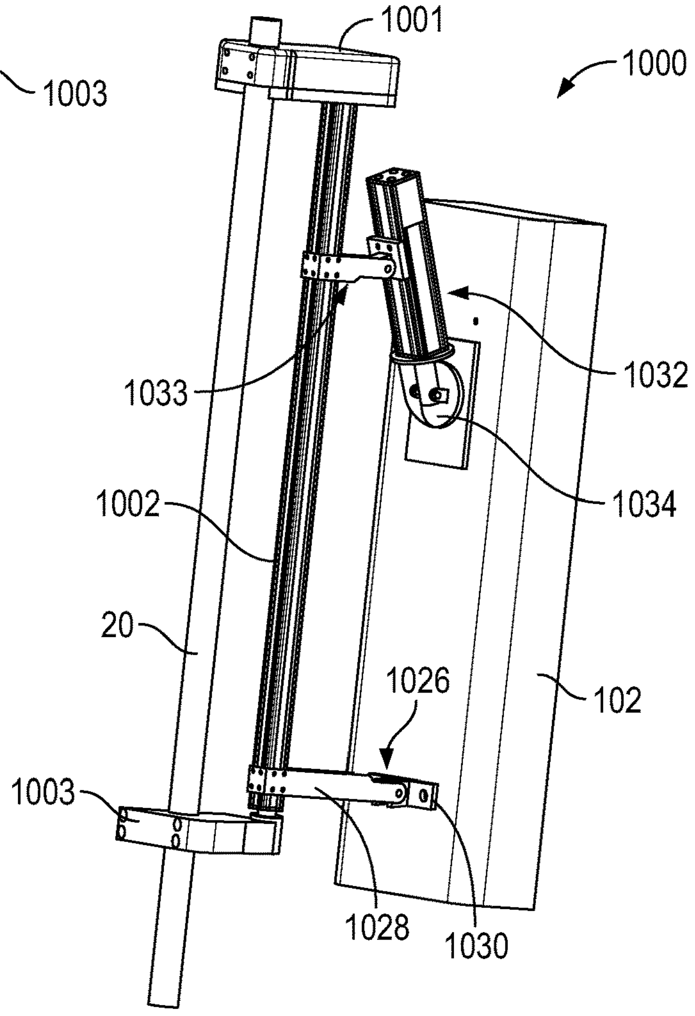
Figure 23:
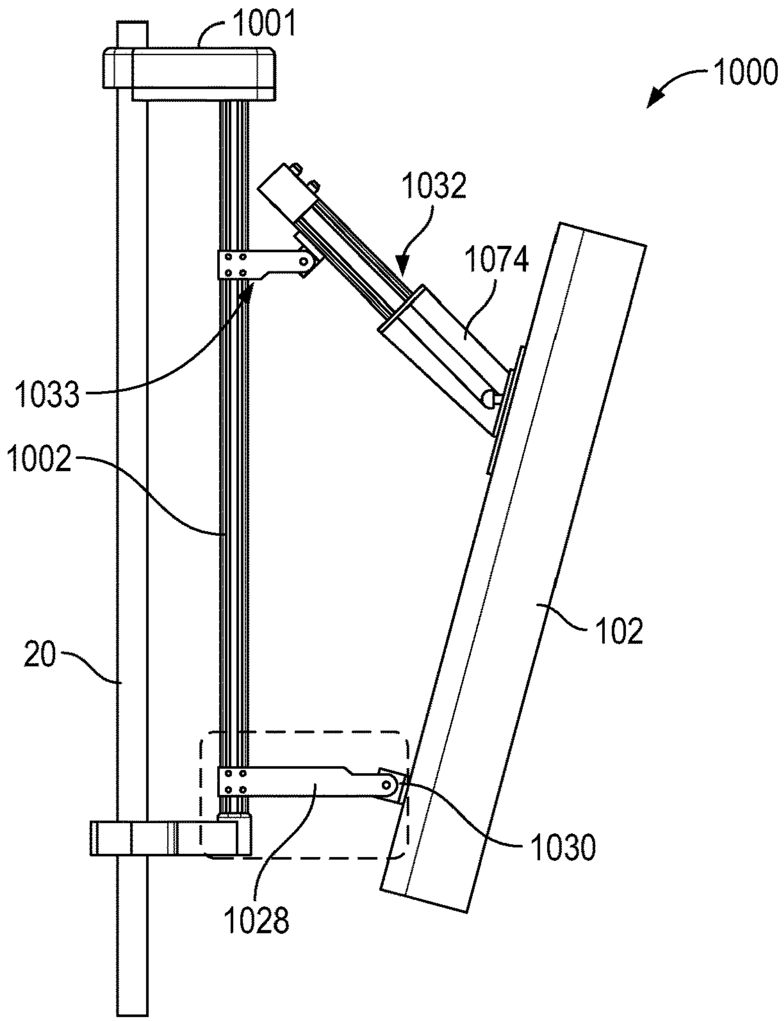
Figure 24:
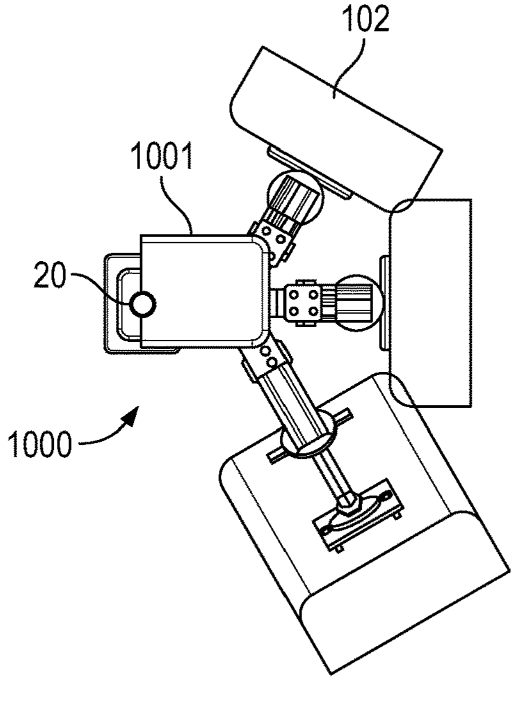
Figure 25:
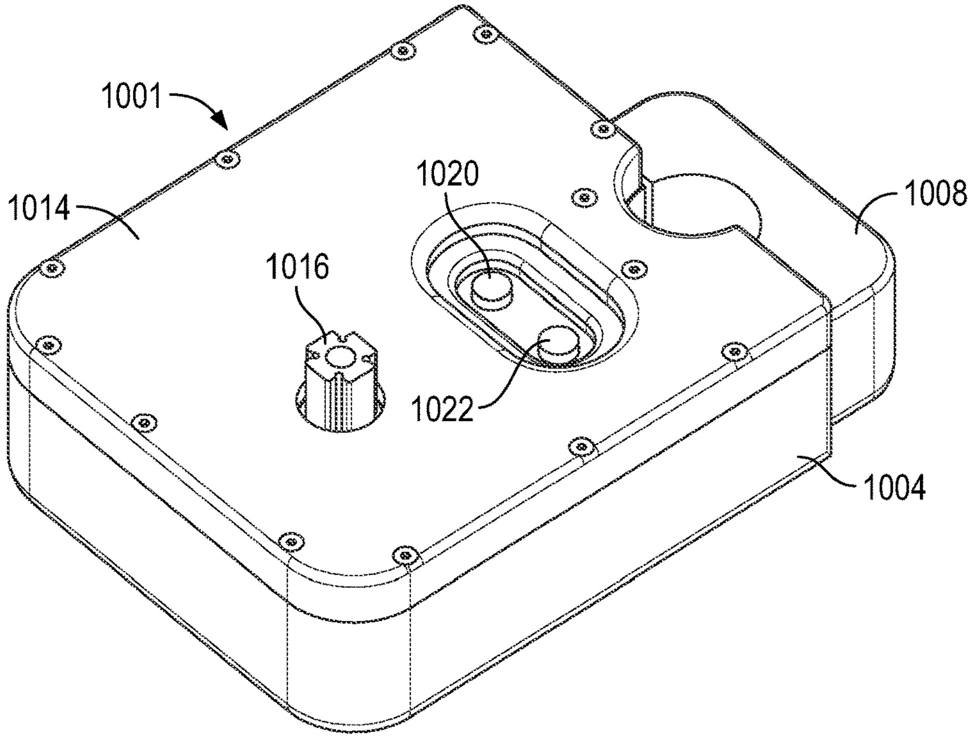
Figure 26:
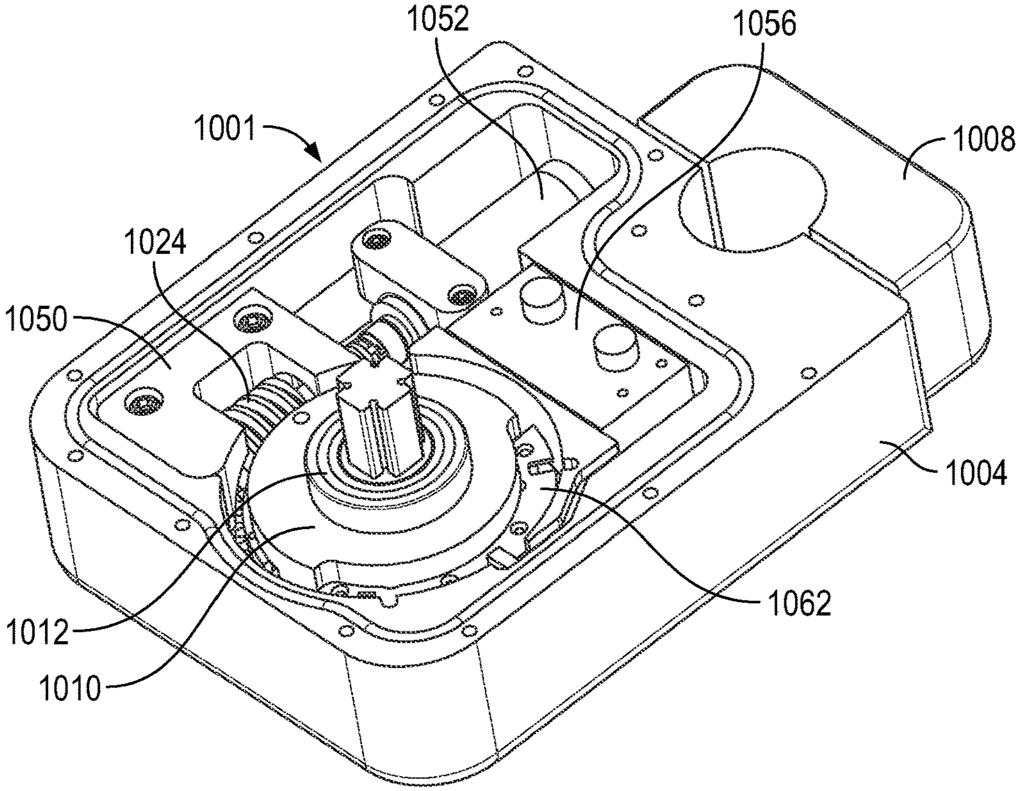
Figure 27:
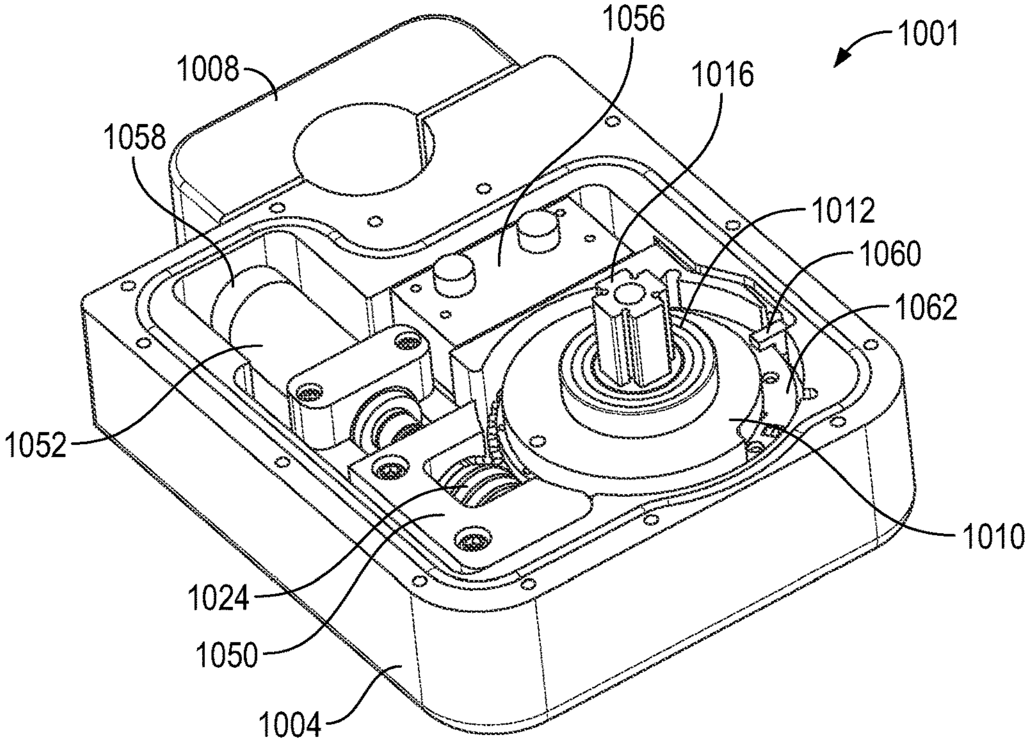
Figure 28:
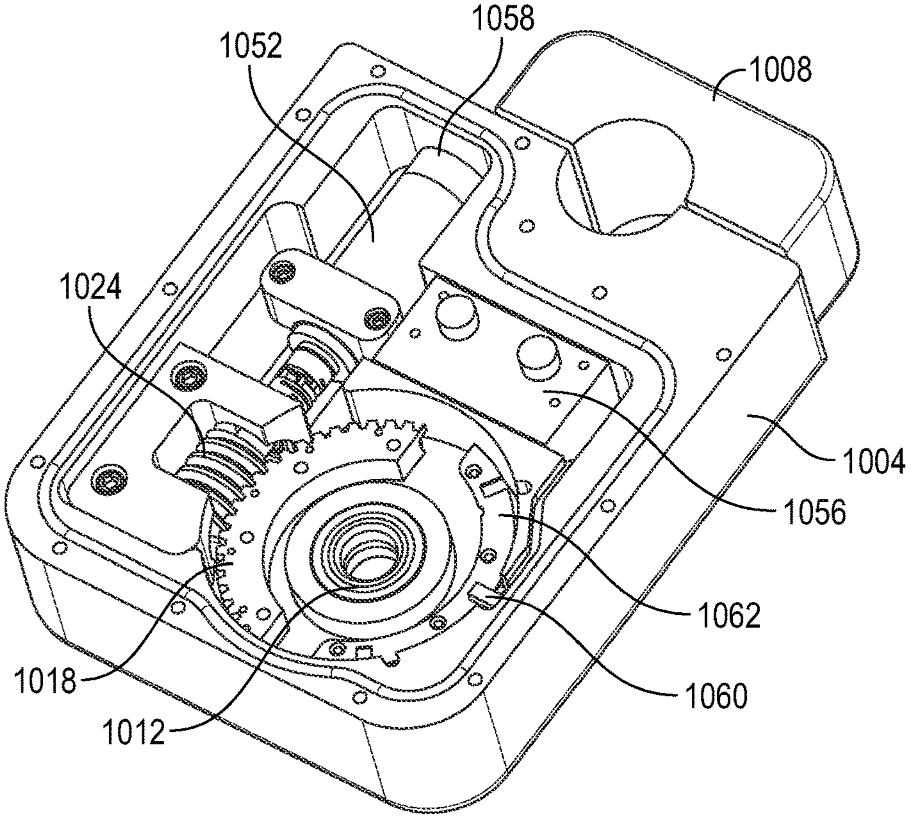
Figure 29:
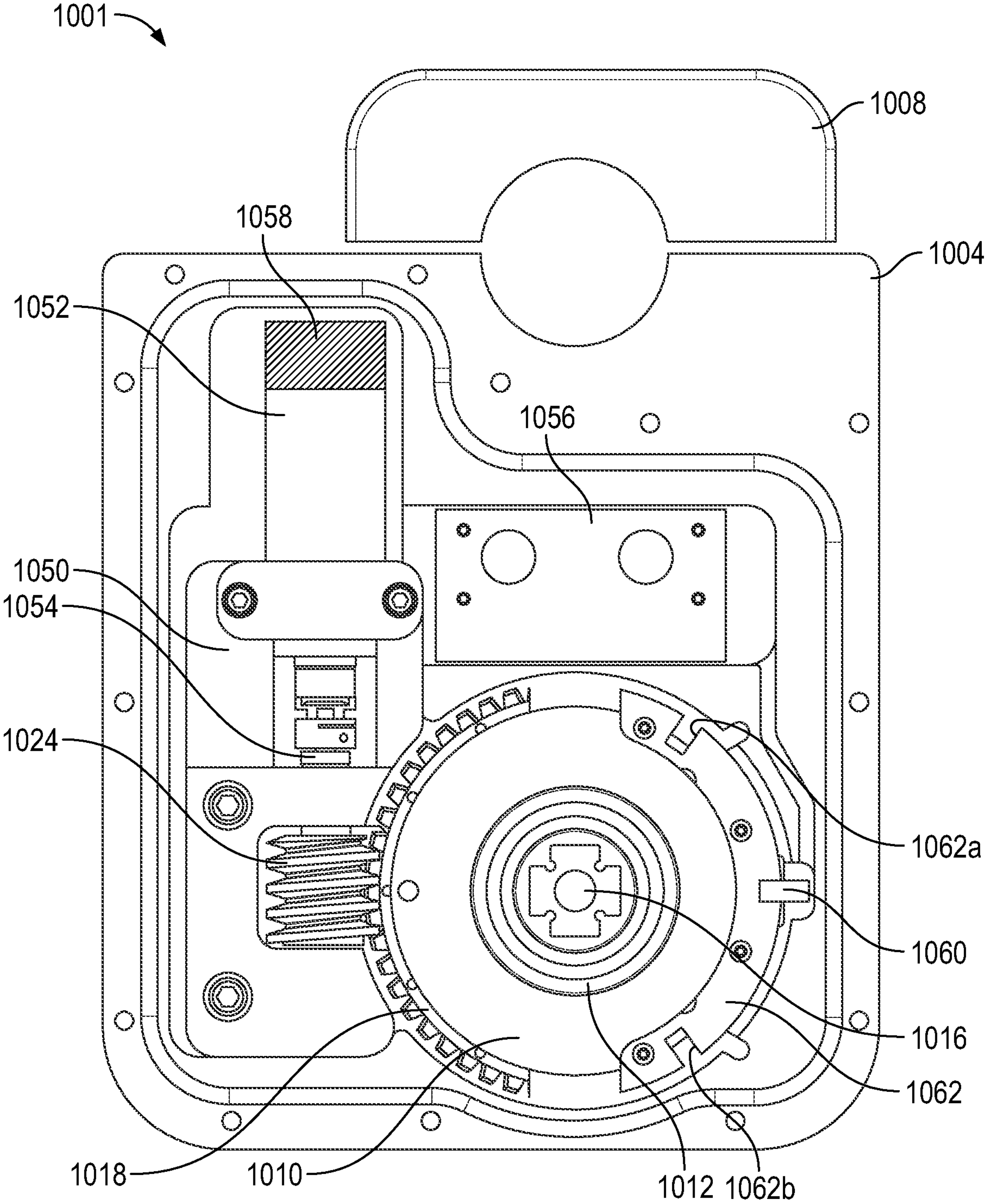
Figure 30:
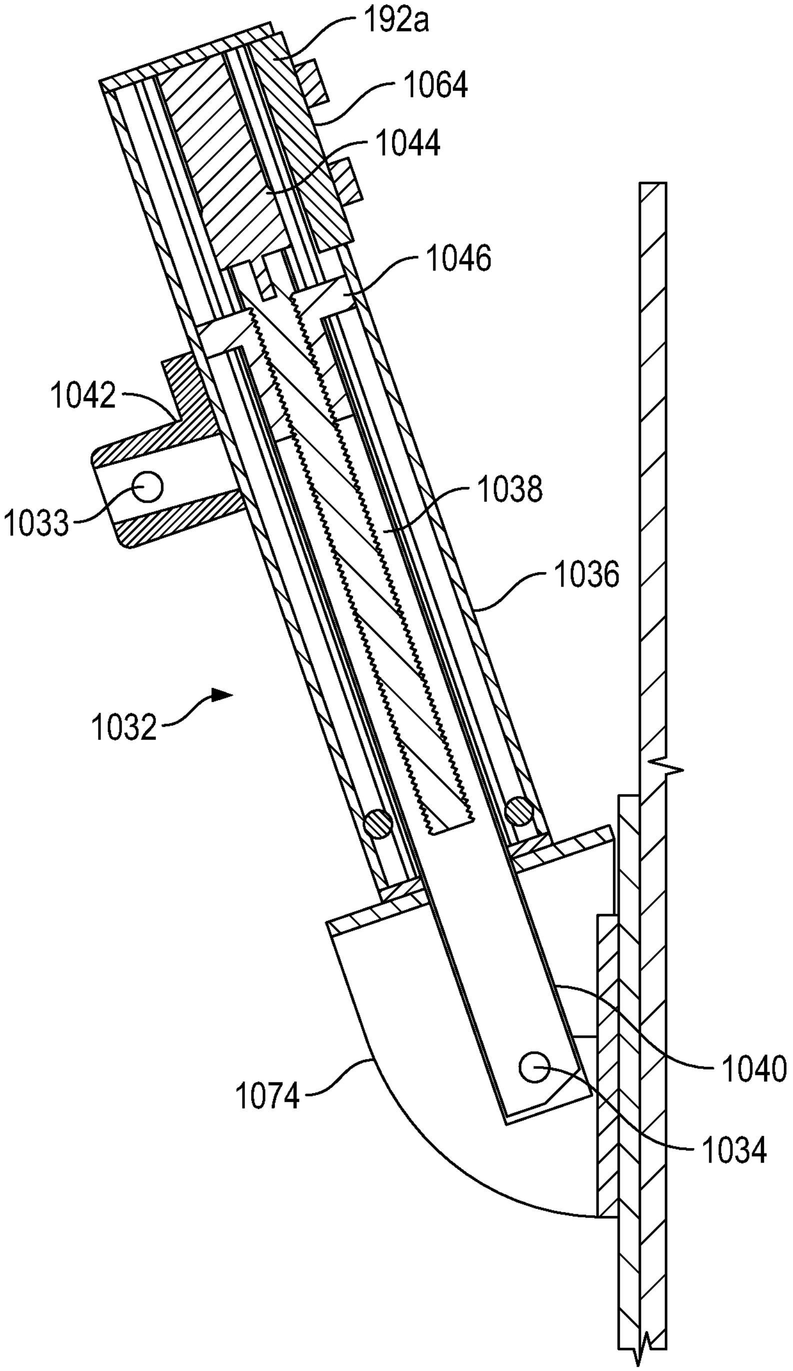
Figure 31:
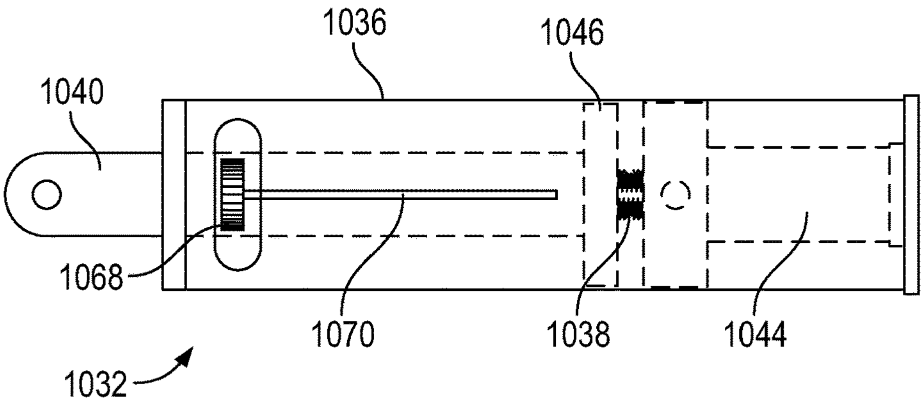
Figure 32:
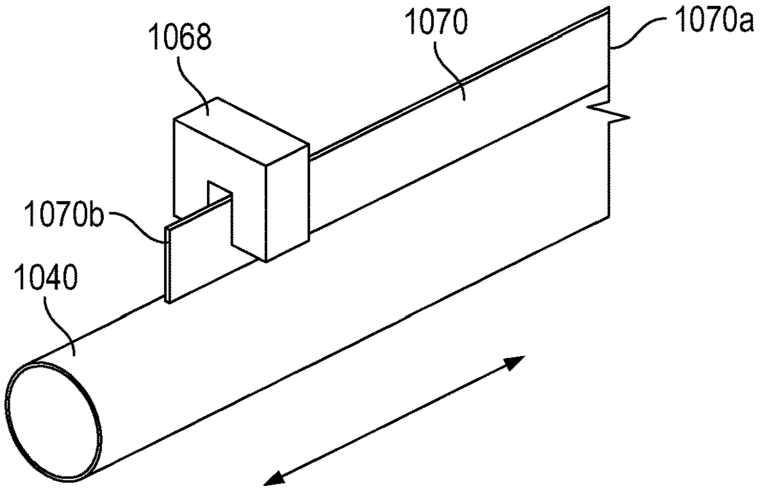
Figure 33:
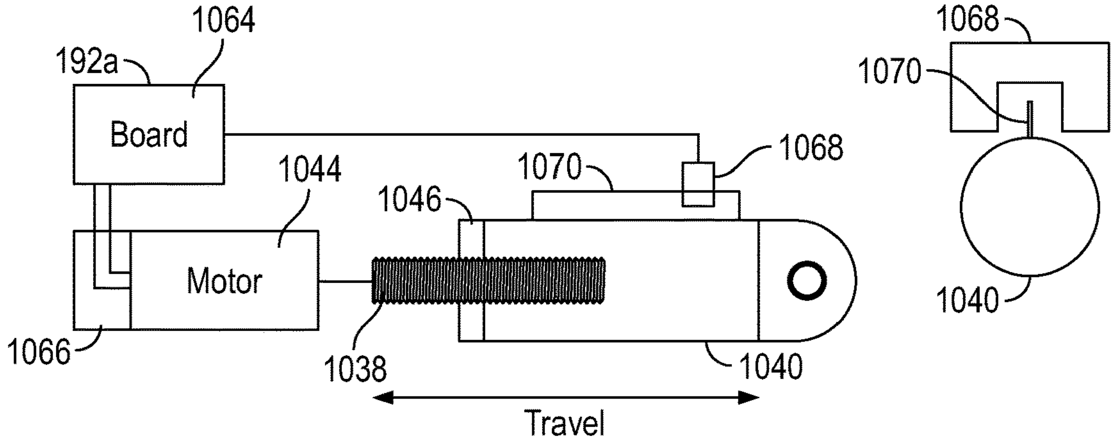
Figure 34:
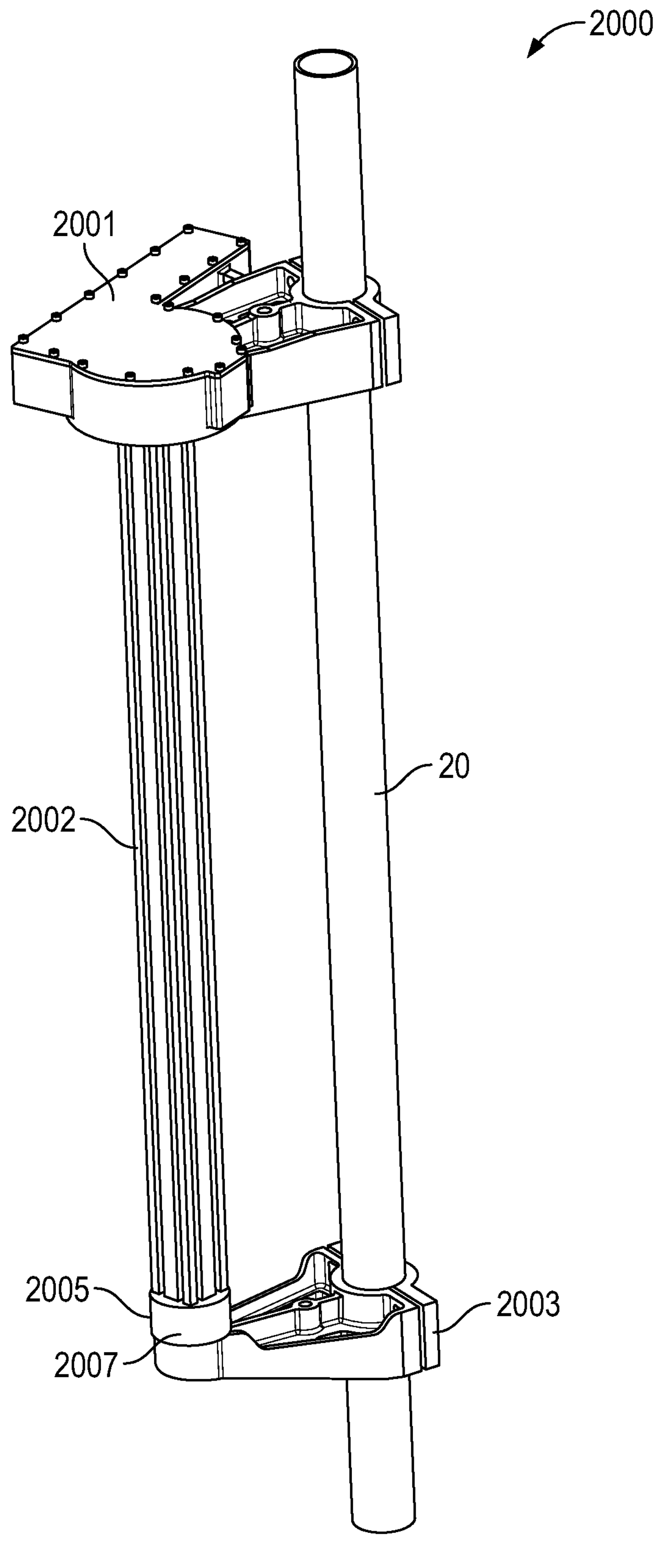
FIGS. 34-42 illustrate another embodiment of the azimuth rotation system with the housing and cover arrangement reversed to provide better stability and support of the gear system from below rather than above.
Figure 35:
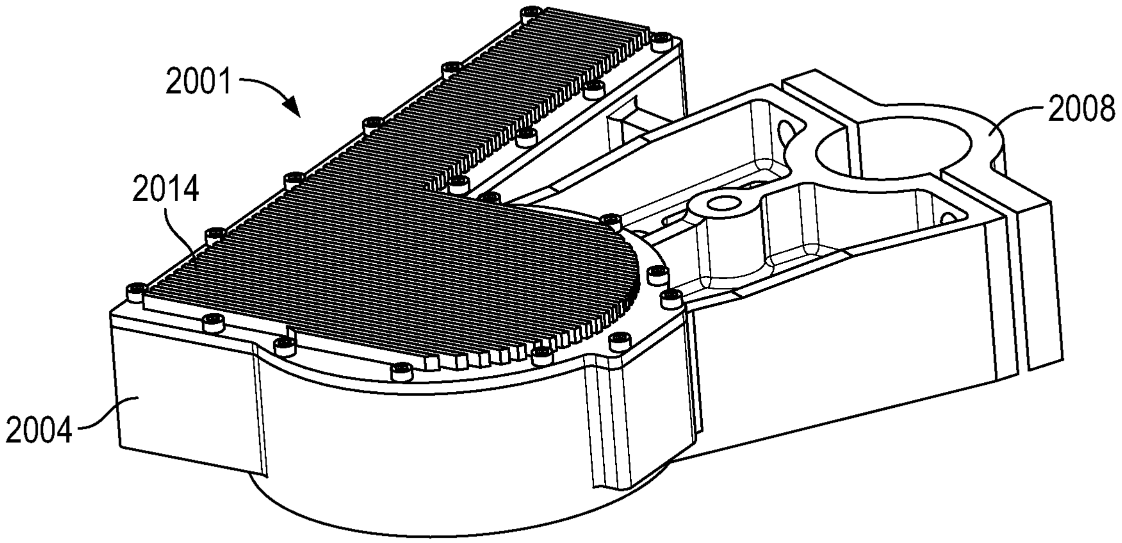
Figure 36:
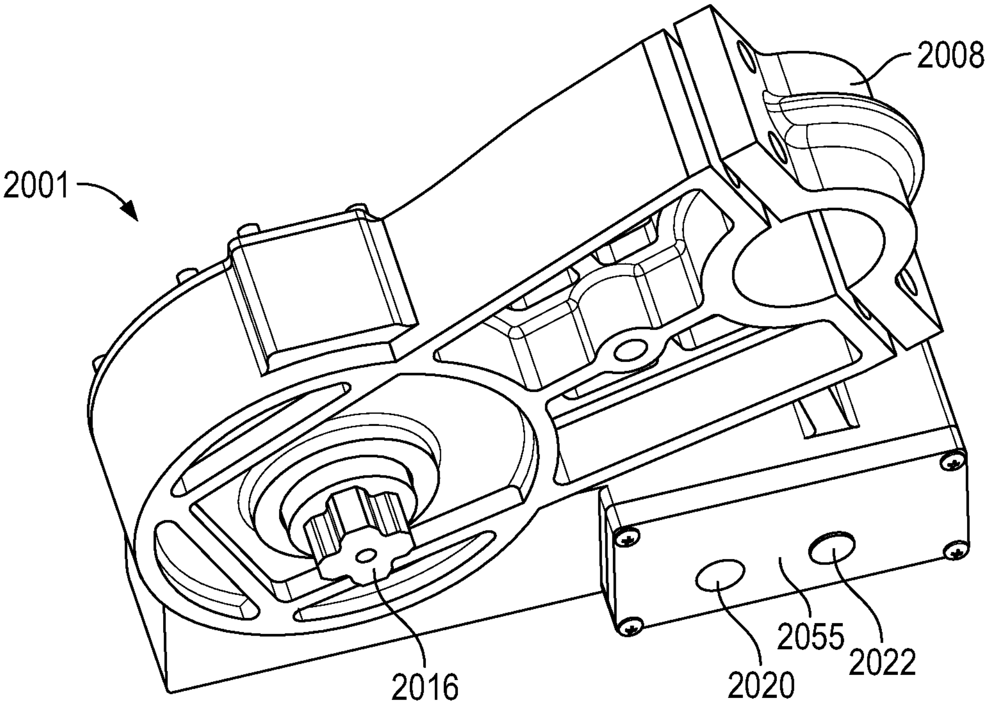
Figure 37:
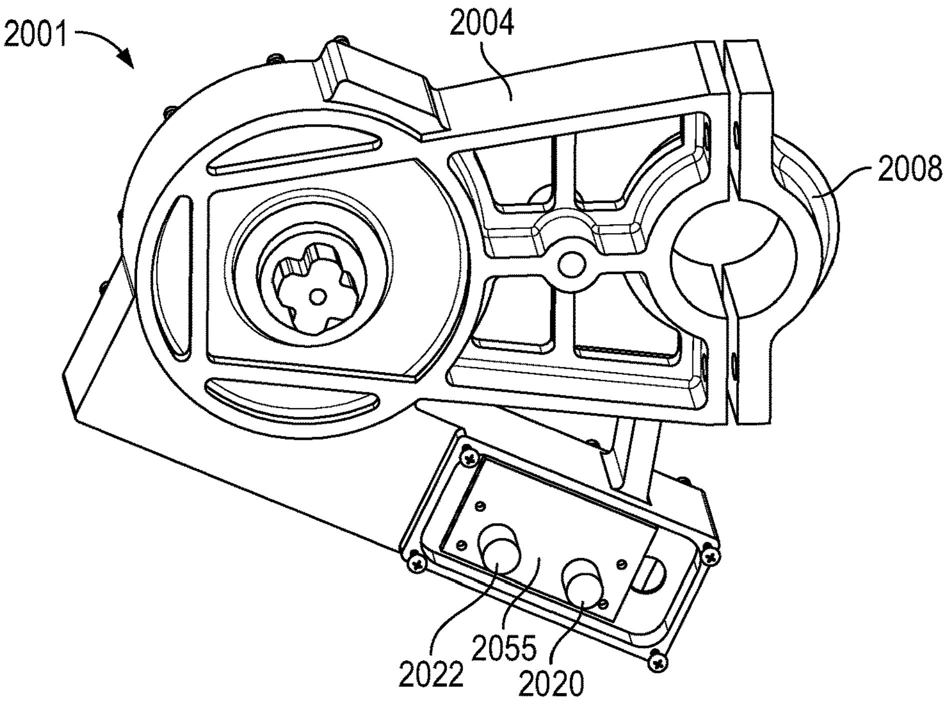
Figure 38:
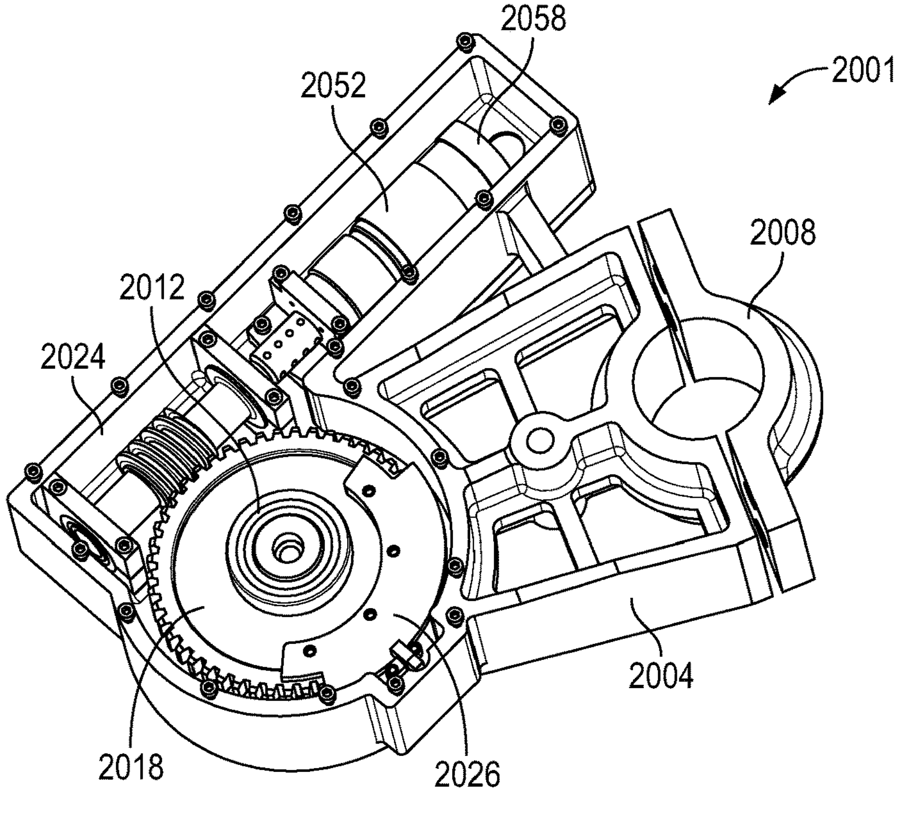
Figure 39:
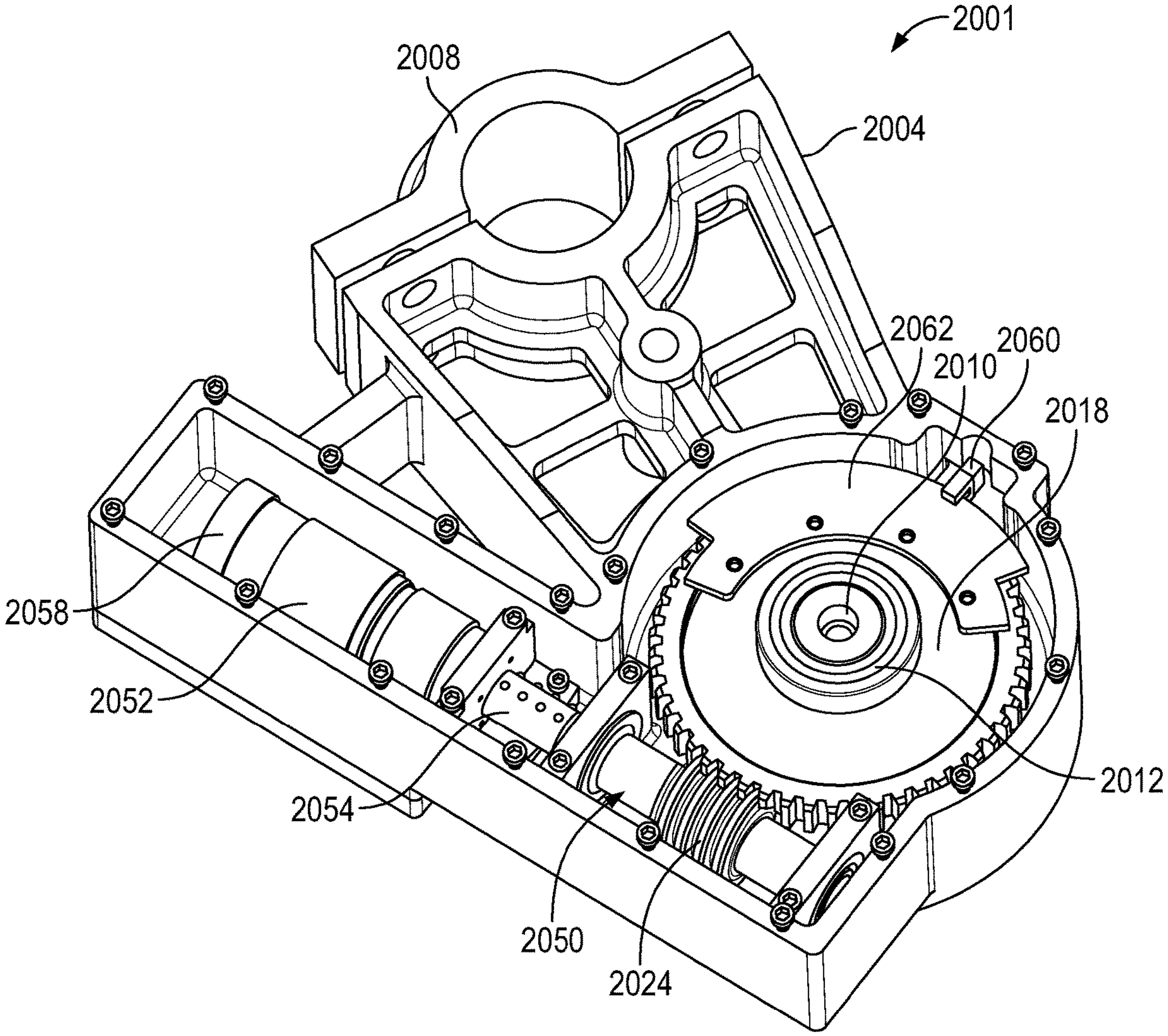
Figure 40:
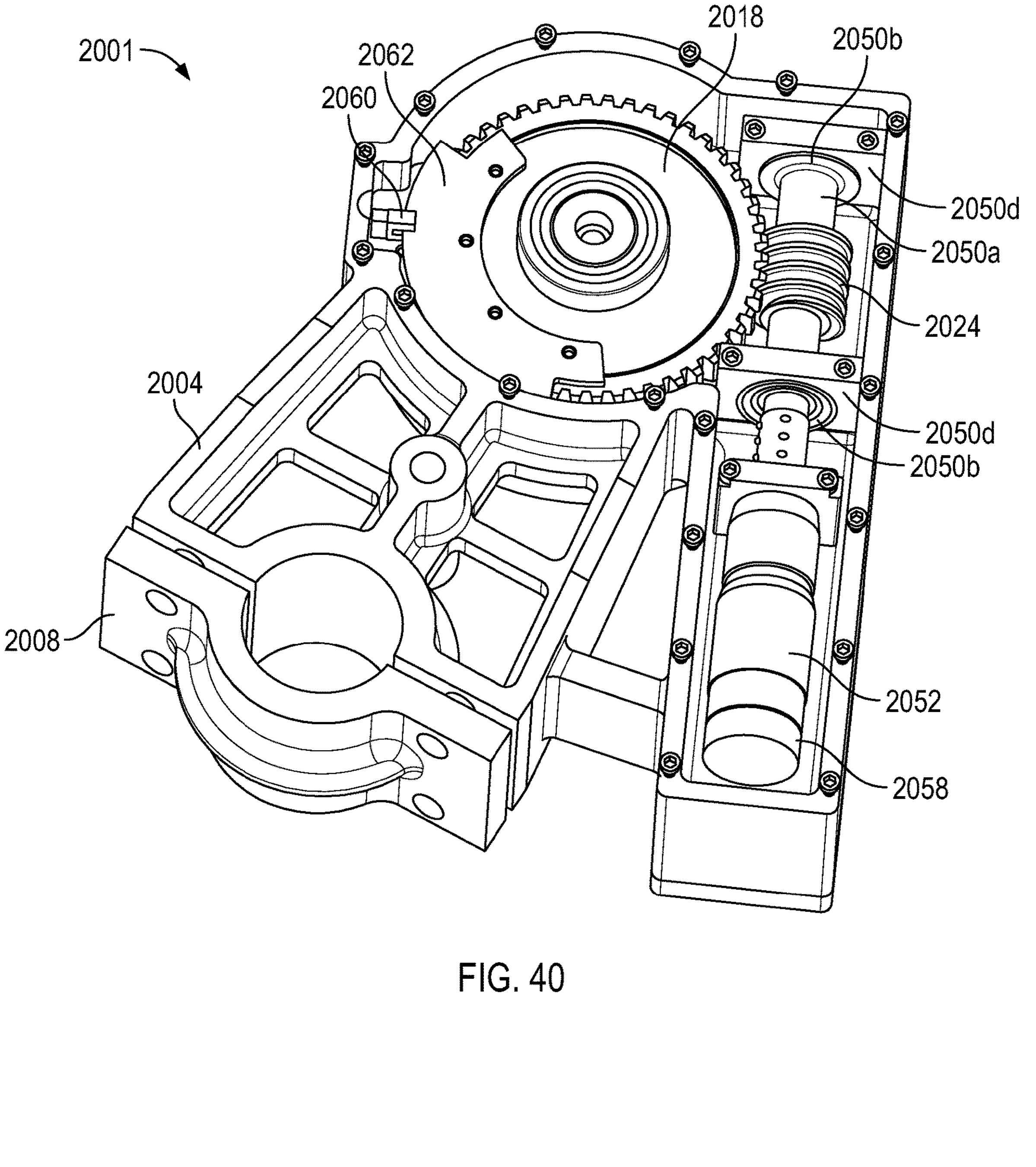
Figure 41:
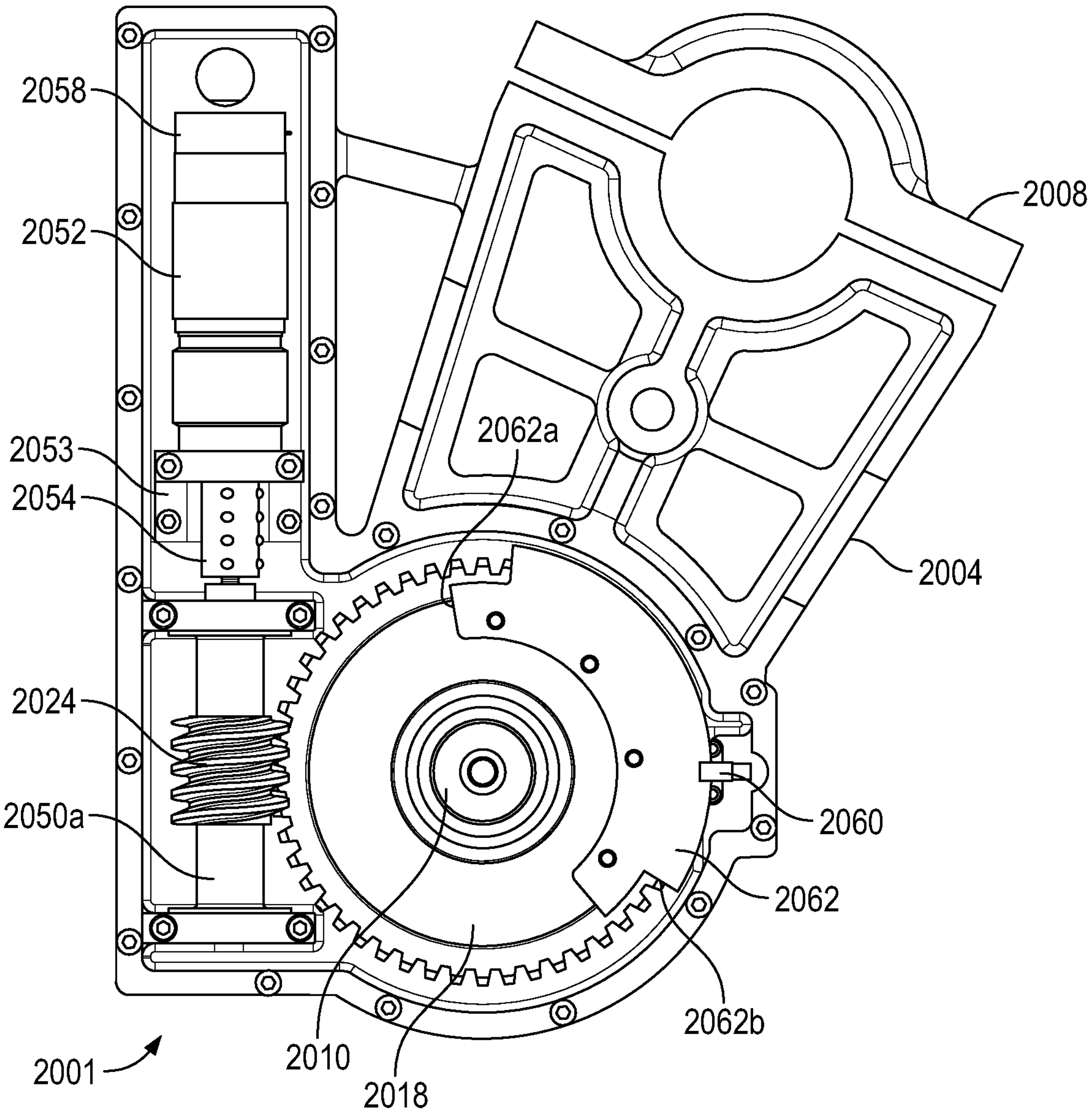
Figure 42:
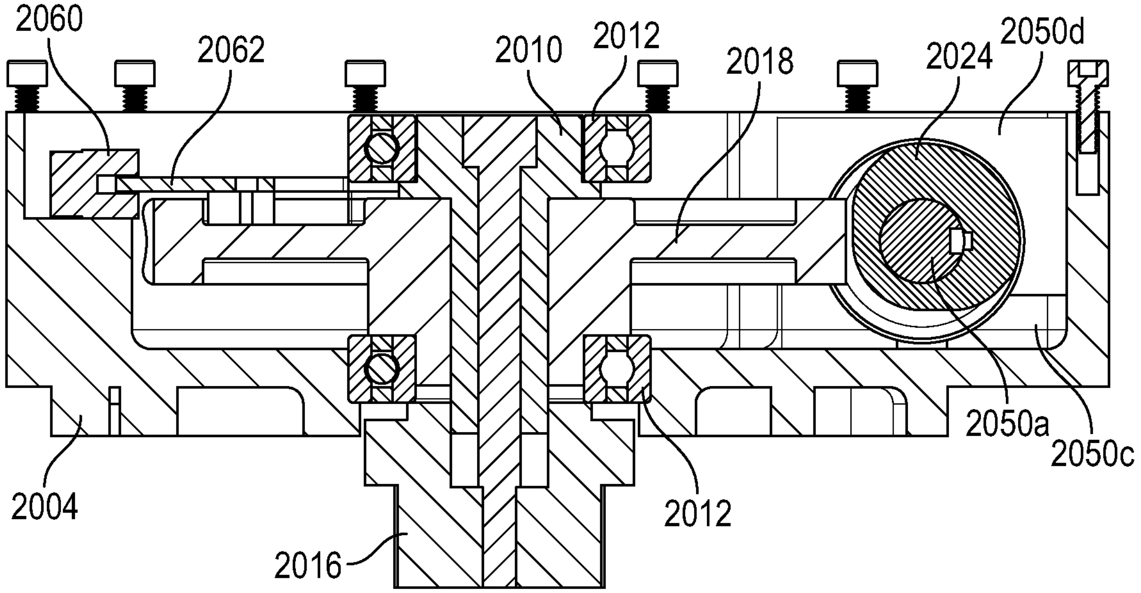
Figure 43:
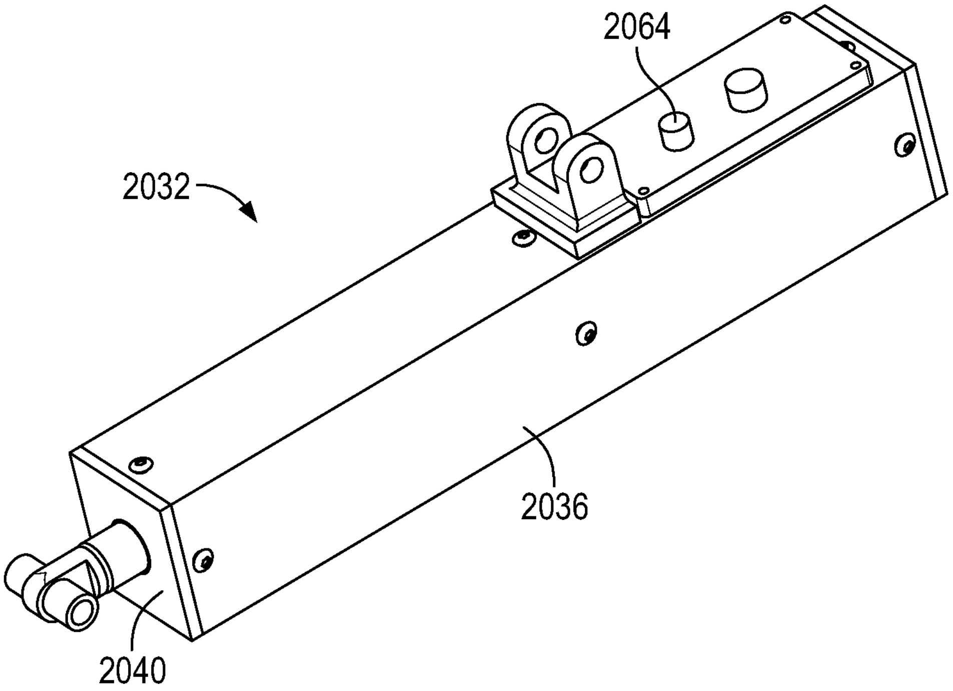
FIGS. 43-49 illustrate another embodiment of the linear downtilt actuator with the threaded drive rod captured in a bulkhead to provide better axial loading capabilities as well as arrangement of the target vane within the interior of the drive housing for better environmental protection.
Figure 44:
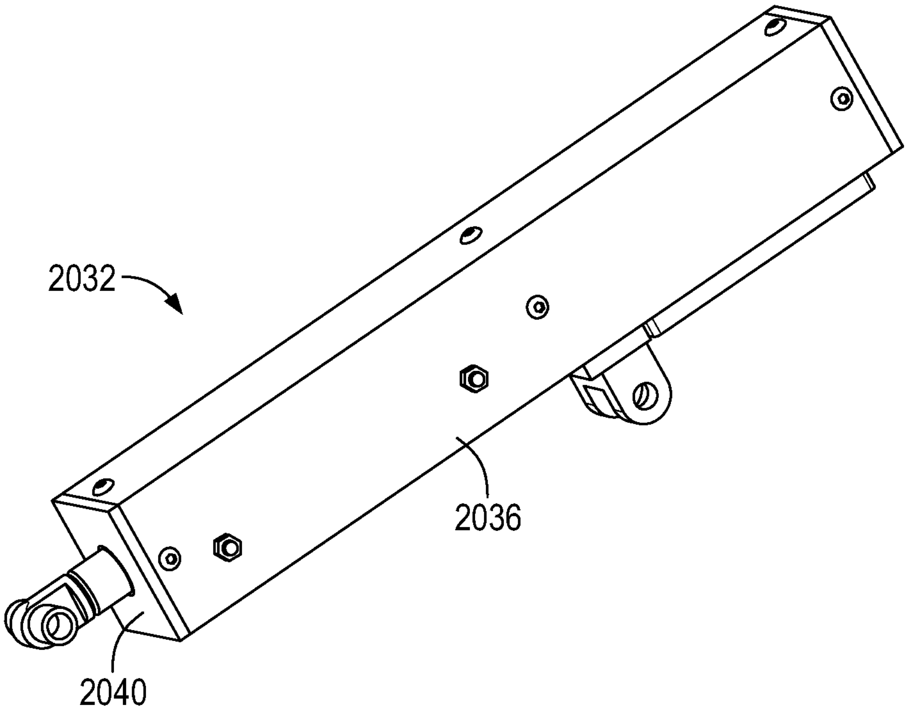
Figure 45:
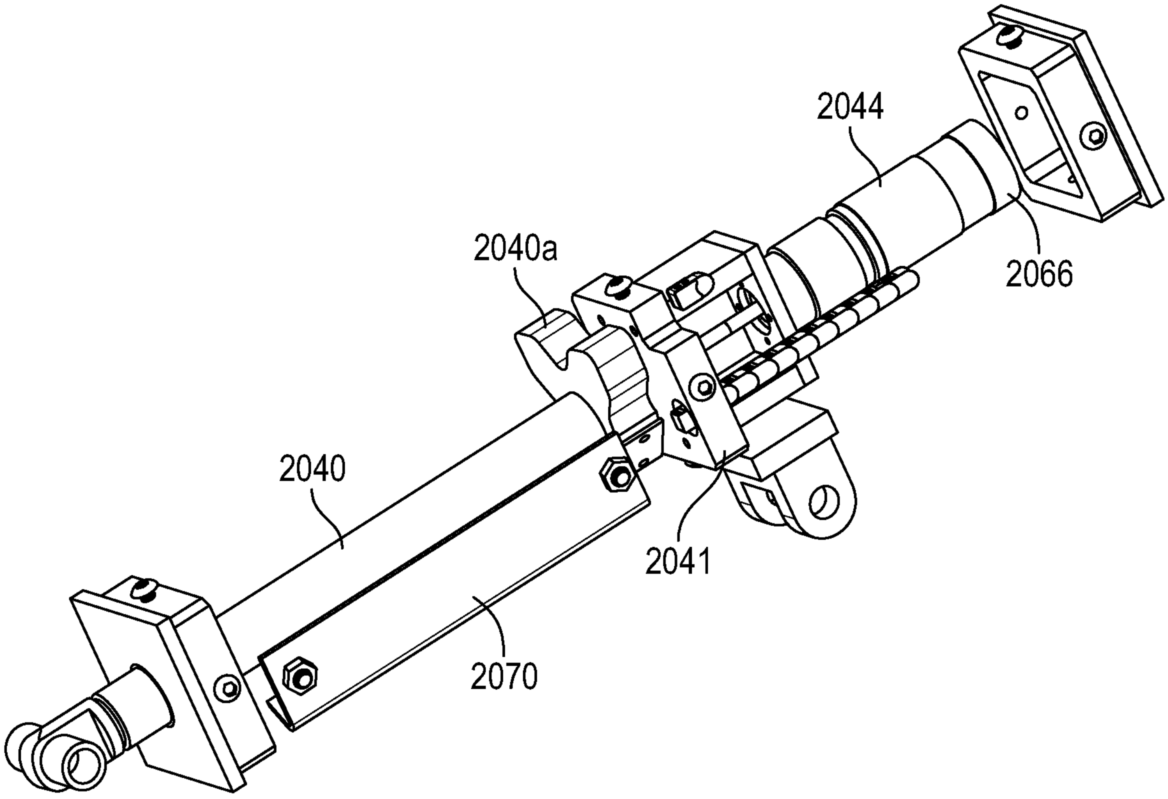
Figure 46:
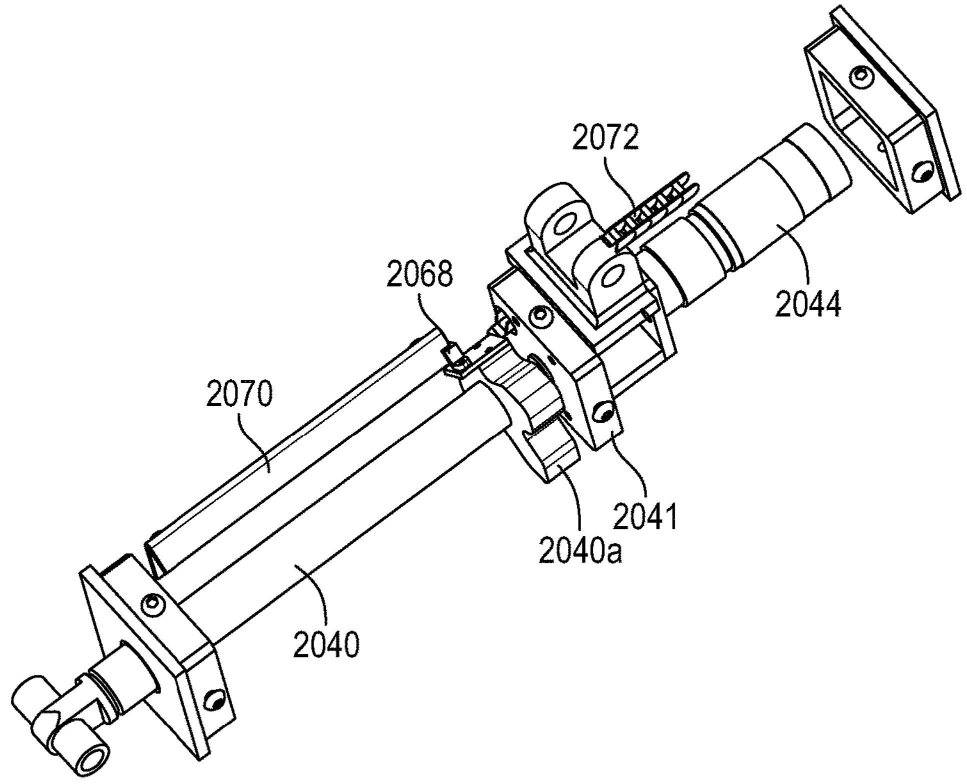

The structure side interface 108 and the antenna side interface 112 are rotatable relative to each other through upper and lower pivot connections aligned along a vertical axis A (See FIGS. 7 and 12). The upper and lower portions of the mount 100 are generally separated into two discreet upper and lower units and to provide the ability to adjust the location of the mount portions relative to the back of the antenna 102. As described above, while most antennas 102 have a standard connection spacing, there is a significant amount of variability and thus a need to have the two portions of the mount separate. However, if designed for a single standard size spacing which is known, the upper and lower portions of the structure side interface 108 could be connected by an elongate body to provide a single unit. The same is true for the antenna side interface 112.

Referring now to FIGS. 6-8, an exemplary embodiment 600 includes an antenna mounting frame 602 having pivot pins 604 and 606 on the top and bottom of the frame 602. The antenna 102 is mounted to the frame 602 and rotation of the frame 602 is driven and controlled by an MACU 171 mounted on a lower clamping mount (504/506). The lower pivot pin 606 includes a follower gear (not shown) which is driven by a geared drive mechanism 514. The drive shaft 512 is the output shaft of a gear reduction unit 514 which is secured below the mount body 506. The MACU 171 is coupled to the input end of the gear reduction unit 514 to drive rotation.

The frame 602 provides a rigid stable platform to secure the antenna 102. The frame 602 is adaptable in size for different size antennas and can be universally adapted for connection to different antennas using different adapter connections.

A linear drive system 610 which may reside in a subframe 612 received within the upper portion of the antenna frame 602. The frame 602 includes a fixed pivot hinge 614 on the lower portion of the frame 602. The fixed pivot hinge 614 is adjustable in location along the length of the frame 602 to accommodate different size antennas 102.

The linear drive system 610 includes a linear drive block 616 which rides on two spaced guide rods 618. The MTCU

192 is mounted to the lower portion of the sub-frame 612 and drives a threaded drive rod 620 received through the drive block 616 to drive linear up and down motion of the linear drive block 616. The top of the antenna 102 is secured to a pivot hinge 622 on the drive block 616 through a tilt arm 624 which is also pivotably secured to a bracket on the rear of the antenna. It can therefore be seen that linear upward movement of the drive block 616 extends the tilt arm 624 and pushes the top end of the antenna 102 outwardly to provide a controlled downtilt of the antenna 102. The linear sub-frame 612 is adjustable in location within the main frame 602 for different size antennas and different mounting needs. The upper and lower mount bodies 504 and 506 are still independently adjustable in location on the pole.

The rigid antenna frame 602 improves rotational stability to the system while the linear tilt drive also improves stability of the system. The frame 602 further provides a platform for the installation of other antenna accessories, or more importantly RF shielding material (not shown). It is becoming more evident that RF back lobe emissions are becoming an issue on overcrowded tower structures and carriers are seeking ways to absorb RF emitted from the rear side of their antennas. The frame 602 provides an ideal location for the installation of RF shielding or RF absorbing materials.

Figure 9:
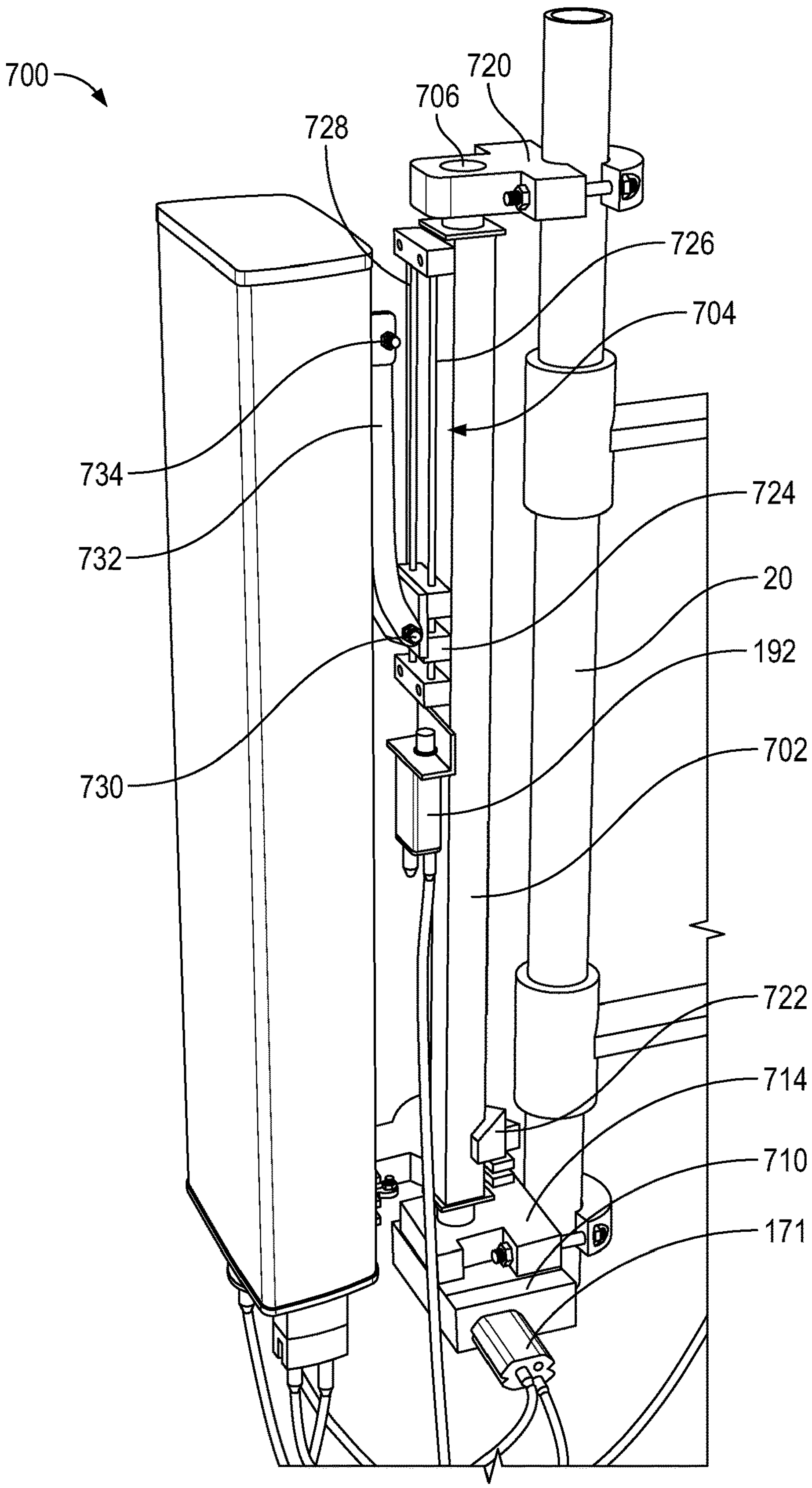
FIG. 9 is a perspective view of yet another exemplary antenna mount assembly include a pivoting mast and linear actuator assembly.
Figure 10:
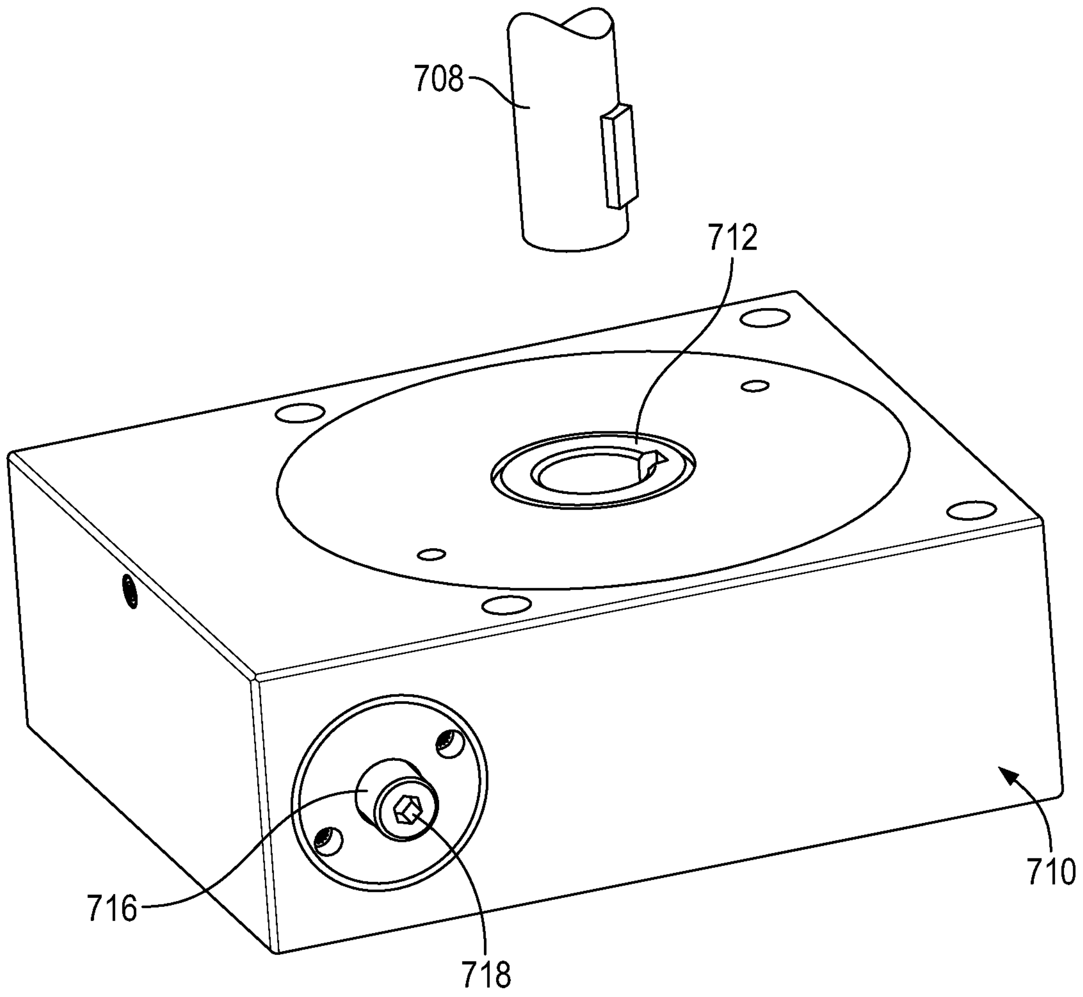
FIG. 10 is an enlarged view of a gear reduction used to drive rotation of the mast in the assembly of FIG. 9.
Figure 11:
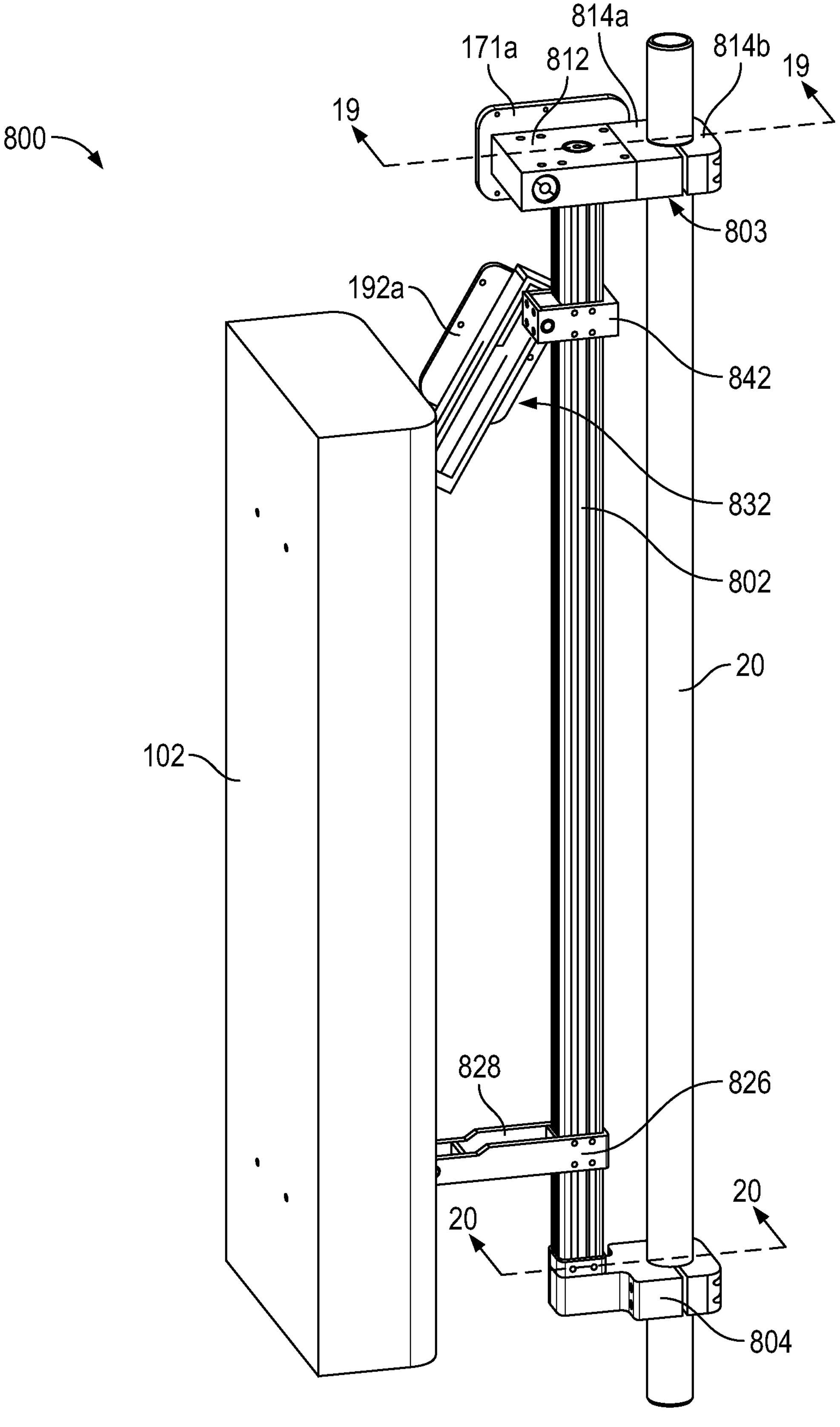
FIG. 11 is a perspective view of an exemplary embodiment with the azimuth control drive mounted at the top of the assembly and including a linear actuator pivotably mounted between the mast and the upper portion of the antenna.

Referring to FIGS. 9-10, in another exemplary embodiment 700, the frame may be replaced with a linear mast 702 on which linear actuator sub-assembly 704 can be mounted. The mast 702 includes upper and lower pivot pins 706, 708 on the top and bottom of the frame 702. The antenna 102 is mounted to the mast 702 and rotation of the mast 702 is driven and controlled in a similar manner with the MACU 171 and a gear reduction unit 710. The lower pivot pin 708 is a keyed shaft which is received into sealed worm gear reduction assembly 710 as best shown in FIG. 10. The gear reduction 710 may comprise a 60-1 self-locking worm gear reduction with either reduced or zero backlash. The drive element (output) 712 is a keyed cylinder of the gear reduction unit 710 which is secured below the mount body 714. The keyed shaft 708 extends through the mount body 714 into the keyed output cylinder 712. Mount body 714 is clamped to the mounting post 20 as previously described. The MACU 171 is coupled to the input shaft 716 of the reduction unit 710 to drive rotation. The input shaft 716 may be provided with 5 mm hex drive opening 718 to receive a like-sized hex drive pin of an exemplary MACU unit 171. Shape and size of the drive interface may be varied as needed for the application.

The upper pivot 706 is a similar 20 mm shaft received into a 20 mm upper bearing (not shown) supported in an upper clamped mount assembly 720 also clamped to mount post 20.

Like the frame 602 above, the mast 702 may be adaptable in size for different size antennas 102 and can be universally adapted for connection to different antennas using different adapter connections.

The sub-frame linear drive 610 (above) is replaced with a dual-guide linear actuator unit 704 having a backplane which may be secured to a forward face of the mast 702. A lower downtilt pivot bracket 722 is secured to the lower portion of the mast 702. The lower pivot bracket 722 is adjustable in location along the length of the mast 702 to accommodate different size antennas 102.

The linear drive actuator 704 includes a linear drive block 724 which rides on two spaced guide rods 726. The MTCU 192 is mounted to the lower portion of the actuator 704 and drives a threaded drive rod 728 received through the drive block 724 to drive the guide block 724 up and down spaced guide rods. The top of the antenna 102 is secured to a pivot hinge 730 on the drive block 724 through a tilt arm 732 which is also pivotably secured to a bracket 734 on the rear of the antenna 102. The linear upward movement of the drive block 724 extends the tilt arm 732 and pushes the top end of the antenna 102 outwardly to provide a controlled downtilt of the antenna 102 as in the previous embodiment. The linear actuator sub-assembly 704 is adjustable in location on the mast 702 for different size antennas and different mounting needs. The upper and lower mount bodies 714 and 720 are still independently adjustable in location on the mounting pole 20.

Some embodiments of the system may include only the azimuth drive system and either mechanical downtilt brackets or a fixed upper and lower mount brackets, while others may include a fixed azimuth clamp mount and a mechanical downtilt drive mechanism.

Turning to FIGS. 11-20, another exemplary embodiment 800 is illustrated. A linear mast 802 may include upper and lower mounts 803, 804 securing the top and bottom of the mast 802 to the main mount post 20. The lower end of the mast 802 may include a cylindrical shaft 806 which is received into a thrust bearing 808 mounted within the lower pivot mount. The shaft 806 may be formed as part of an lower end cap 807 for the mast 802. The thrust bearing 808 may be a sealed bearing for weather resistance and may further be self-centering to provide tolerance for a misaligned mounting post 20 or misaligned mounts 803, 804. The upper pivot pin 810 is a keyed shaft as described above and is received directly into the keyed gear reduction assembly 812 (same as unit 710 above), which is now located at the top of the mast 802 and secured to the mounting pole 20 with a modified clamp that extends from the gear reduction assembly 812. The keyed shaft 810 may also be formed as part of an upper end cap 809 for the mast 802. In the illustrated embodiment, the clamping mount 803 is secured with elongated fasteners that extend through clamping blocks 814 into the body of the gear reduction unit 812. Other mounting configurations are contemplated where the gear reduction assembly 812 is received above or below another pivot mount identical to the lower pivot mount 806. The antenna 102 is mounted to the mast 802 and rotation of the mast 802 is driven and controlled in a similar manner as noted above with embodiment 700. As noted above, the gear reduction 812 may preferably comprise a 60-1 self-locking worm gear reduction with either reduced or zero backlash. The output drive 816 is the same keyed cylinder of the gear reduction unit 812 which is received at the top of the mast 802. The keyed shaft 810 extends directly into the keyed cylinder 816 from below. The MACU 171A is another AISG compatible motor control unit and is coupled to the input shaft 818 of the gear reduction unit 812 to drive rotation. It is noted here that the present MACU unit utilizes a servo motor configuration as opposed to a stepper motor configuration. The servo motor configuration is advantageous because it better self-locks without the application of voltage. Slippage when in an unpowered state is an inherent drawback to the use of stepper motor configurations which allowed the drive shaft to rotate when power was not applied. The input shaft 818 is provided with an opening compatible with the drive pin of the MACU unit 171A. The MACU 171A includes male and female AISG bidirectional serial ports 820, 822 as previously described. The antenna 102A utilizes the same ACU units designated as 104A. All of the ACU 104A, MACU 171A and MTCU 192A motor controllers are serially connected as described above and capable of serial interconnected communication using the AISG protocol and appropriate AISG compatible cables (not shown for clarity).

Like the mast above, the mast 802 is adaptable in size (length as well as width and depth) for different size antennas 102 and can be universally adapted for connection to different antennas using different adapter connections. The mast 802 is further provided with longitudinal mounting channels 824 to universally receive a variety of different accessories at any location on any surface of the mast 802. This is particularly suitable for mounting cable stays and EMI shielding in appropriate locations along the mast 802.

A lower pivot bracket 826 is secured to the lower portion of the mast 802. The lower pivot bracket 826 is slidably received around or otherwise adjustably secured the mast 802 and is slidably adjustable in location along the length of the mast 802 to accommodate different size antennas 102. The bracket 826 has a support arm 828 which extends forwardly and is pivotably mated with a mounting bracket 830 on the lower rear of the antenna 102A.

The dual guide linear actuator 704 (from above) is replaced by a linear actuated guide rod assembly 832 which is pivotably secured at one end to the mast 802 and at the other end to the upper antenna interface bracket 834. The linear actuator unit 832 may in some embodiments comprise an SLA55 Rod Actuator with a 300 mm stroke length (Anaheim Automation). The actuator 832 includes a main body portion 836 which houses a threaded rod 838. The terminal end of the rod 838 extends from the housing 836 and includes a rotatable head 840. The head 840 is pivotably secured to the mounting bracket 834 on the upper end of the antenna 102A. Rotation of the threaded rod 838 extends the rod 838 from the housing 836 to create elongation or extension of the unit 832 and resulting downtilt of the antenna 102A relative to the mast 802.

A fixed pivot block 842 is slidably secured to the upper end of the mast 802 and includes a pivot pin 844 which extends through the block 842 and through a base end of the actuator body 836. The MTCU 192A is mounted to the body 836 of the actuator 832 and through a right-angle drive coupling 846 drives the threaded drive rod 838. As noted above, the top of the antenna 102 is secured to the pivoting head 840 on the drive rod 838. The linear outward extension of the drive rod 838 pushes the top end of the antenna 102 outwardly to provide a controlled downtilt of the antenna 102 similar to the previous embodiments. Reverse motion draws the threaded rod 838 in and returns the antenna to its 0 degree upright position. The linear actuator sub-assembly 832 and block 842 are adjustable in location on the mast 802 for different size antennas and different mounting needs. The upper and lower mount bodies 803, 804 are still independently adjustable in location on the mounting pole 20.

In some embodiments, the entire downtilt mechanism may be eliminated to provide an azimuth (bearing) only adjustment. In this case, a second bracket 826 replaces the upper linear actuator assembly 832 to provide another fixed mounting point to a bracket 830 at the upper end of the antenna 102. Further in this case, the support arms 828 on the brackets can be shorter bringing the antenna 102 closer to the mast 802 and improving the center of gravity of the entire device.

FIGS. 21-33 illustrate a further embodiment 1000, where the upper mount, gear reduction, pivot and control system are integrated into an enclosed drive unit 1001 (MACU).

A linear mast 1002 is rotatably captured between a lower mount 1003 and the integrated drive unit 1001 securing the top and bottom of the mast 1002 to the main mount post 20.

The lower portion of the mast 1002 is provided with a pivot shaft (not shown—see pivot shaft 806 in earlier FIG. 20) which is received into a thrust bearing (not shown—see bearing 808 in earlier FIG. 20) mounted within the lower pivot mount 1003. The shaft is formed as part of and end cap for the mast 1002. The lower mount 1003 may include a lip seal (not shown) for protecting the bearing for weather resistance.

The upper mount may comprise a fully integrated support and rotational drive unit 1001 including a housing 1004 which is clamped to the main mount post 20. In the illustrated embodiment, the drive housing 1004 is secured with elongated fasteners that extend through a clamp 1008 into the drive housing 1004 to capture the post 20 therebetween.

Turning to FIGS. 25-29, contained within the drive housing 1004 is a main drive hub 1010 which is rotatably mounted on bearings 1012 between the housing 1004 and the mount body cover 1014. The main drive hub 1010 includes a shaped drive post 1016 which extends through one of the bearings and through an opening in the cover 1014 where it receives the upper end of the mast 1002. The upper portion of the mast is keyed to the shaped posted 1016 on the drive hub by its internal extruded shape geometry, or alternatively the hub 1010 may have a complementary shape which captures the external surface of the mast (see FIG. 19).

The main drive hub 1010 includes a drive gear section 1018 which is mated with a corresponding worm gear 1024 rotatably mounted within a sliding carriage system 1050 which allows easier assembly. The worm gear drive ratio may be 50-1, 60-1 or other suitable ratios which provide a self-locking gear assembly with either reduced or zero backlash.

In the present integrated drive unit 1001, the system includes a servo drive motor 1052 with a planetary gear reduction between about 100-1 to 400-1. In some embodiments, the gear reduction may be about 250-1. The servo motor 1052 configuration with a high planetary gear reduction is advantageous because it provides an effective brake on the worm gear 1024 further improving the self-locking aspect of the worm gear assembly without the application of voltage on the motor 1052.

The motor 1052 is secured within the carriage 1050 and coupled to a worm gear drive shaft 1054.

The motor 1052 is controlled by an AISG compatible controller system 1056. End stop positions are sensed by a magnetic position sensor arrangement integrated with the drive hub 1010. Rotational position sensing between the end stops is provided by a multichannel encoder 1058 integrated with the motor and motor drive shaft.

In the end stop arrangement, a hall sensor 1060 contains an internal magnet and Hall effect sensor mounted in a twin tower or arm configuration. An arcuate ferrous target vane 1062 of predetermined arc length is removably secured to the drive hub 1010. The target vane 1062 is sized for a particular arc length corresponding to the desired rotational drive extent of the antenna 102. As the drive hub 1010 rotates with rotation of the motor 1052 and worm 1024, the target vane 1062 passes between the tower gap in the sensor 1060, and when a respective end of the target vane 1062 passes the Hall sensor 1060, the magnetic field is interrupted, and switches the digital state of the sensor to signal end of travel extent. In this regard, the target vane 2062 may be interchanged with other target vanes of different arcuate length to easily modify, limit or extend the arcuate range of travel of the system. As noted above, rotational position between the end stops 1062A,B is measured by the motor multichannel encoder 1058 which counts pulses between the opposing end stops 1062A,B.

The controller 1056 includes male and female bidirectional serial ports 1020, 1022 as previously described. The antenna 102 may (or may not) utilize the same ACU units designated previously as 104. The motor controller 1056 may serially connected as described above and capable of serial interconnected communication using the AISG protocol and appropriate AISG compatible cables (not shown for clarity). Non-AISG command protocol, such as serial AT command sets may also be implemented using the same serial bus and cable connections. These generic serial commands allow the system to be utilized in other non-ASIG environments or with non-AISG control systems.

The antenna 102 may be mounted to the mast 1002 and rotation of the mast 1002 is driven and controlled in a similar manner as noted above with earlier described embodiments.

Like the masts above, the mast 1002 is adaptable in size (length as well as width and depth) for different size antennas 102 and can be universally adapted for connection to different antennas using different adapter connections. The mast 1002 is further provided with longitudinal mounting channels to universally receive a variety of different accessories at any location on any surface of the mast 1002. This is particularly suitable for mounting cable stays, EMI shielding, RF shielding, etc. in appropriate locations along the mast 1002.

A lower pivot bracket 1026 is secured to the lower portion of the mast 1002. The lower pivot bracket 1026 is slidably received around the mast 1002 and is slidably adjustable in location along the length of the mast 1002 to accommodate different size antennas 102. The bracket 1026 has a support arm 1028 which extends forwardly and is pivotably mated with a mounting bracket 1030 on the lower rear of the antenna 102.

The downtilt linear actuator assembly 1032 (MTCU) is pivotably secured at one end to an arm bracket 1033 on the upper portion of the mast 1002 and at the other end to the upper antenna interface bracket 1034. The actuator 1032 includes a main body portion 1036 which houses a threaded drive rod 1038 which may have a thread pitch of between 8-1 to 20-1. In some embodiments, the thread pitch may be 10-1. Similar to the worm gear self-locking arrangement, the higher thread pitch provides a stable self-locking actuator which will resist vibration and movement. The threaded drive rod 1038 is driven by a servo drive motor 1044 with a planetary gear reduction between 100-1 to 300-1. The servo motor configuration with a high planetary gear reduction is advantageous because it provides an effective brake on the threaded drive rod 1038 further improving the self-locking aspect of the assembly without the application of voltage on the motor 1044.

The threaded drive rod 1038 is rotatably coupled to a threaded drive nut 1046 (lead nut) which is part of a piston 1040. The terminal end of the piston 1040 extends from the housing 1036 and includes a pivot head which is pivotably secured to the mounting bracket 1034 on the upper end of the antenna 102. Rotation of the threaded rod 1038 extends the piston 1040 from the housing 1036 to create elongation or extension of the unit 1032 and resulting downtilt of the antenna 102 relative to the mast 1002.

The motor 1044 is secured on a motor mount within the interior extended profile of the housing 1036 and is coupled to the threaded rod 1038 by a suitable drive coupler.

The motor 1044 is controlled by an AISG compatible controller (MTCU) 1064. similar to the MACU. End stop positions are sensed by a magnetic position sensor arrangement integrated with the housing 1036 and piston 1040. Position sensing is provided by a multichannel encoder 1066 integrated with the motor drive shaft.

In the linear end stop arrangement, a hall sensor 1068 is mounted to the housing 1036 and contains an internal magnet and Hall effect sensor mounted in a twin tower (arm) configuration. A ferrous target vane 1070 is linear and secured longitudinally along the piston body 1040. The target vane length is sized for a particular linear travel distance corresponding to the desired extension of the piston 1040 corresponding to a desired size and downtilt angle of the antenna 102. As the piston 1040 extends the target vane 1070 passes between the tower gap in the sensor 1068, and when the ends 1070A,B of the target vane 1070 pass the Hall sensor 1068, the magnetic field is interrupted, and switches the digital state of the sensor which serves as an input to the controller to de-energize the motor.

As noted above, the top of the antenna 102 is secured to the pivoting head on the piston rod 1040. The linear outward extension of the piston 1040 pushes the top end of the antenna 102 outwardly to provide a controlled downtilt of the antenna 102 similar to the previous embodiments. Reverse motion draws the piston 1040 in and returns the antenna to its 0 degree upright position. The linear actuator sub-assembly 1032 and block 1042 are adjustable in location for different size antennas and different mounting needs. The upper drive unit 1001 and lower mount 1003 are still independently adjustable in location on the mounting pole 20.

In some embodiments, it may be advantageous to pin the drive unit 1001 and the lower mount 1003 to the pole to fix the vertical location and rotational orientation of the mounts to the post 20. In particular, proper rotational orientation of the drive unit and lower mount is critical to providing proper rotation of the mast 1002.

In some embodiments, a bellows 1074 may be captured between the terminal end of the housing 1036 and the piston head to create a sealed environment protecting the ferrous target vane 1070 from the elements.

In some embodiments, the entire downtilt mechanism may be eliminated to provide an azimuth only adjustment along with electrical downtilt. In this case, a second bracket replaces the upper linear actuator assembly to provide another fixed mounting point to a bracket at the upper end of the antenna 102. Further in this case, the support arms on the brackets can be shorter bringing the antenna 102 closer to the mast 1002 and improving the center of gravity of the entire device.

FIGS. 34-42 illustrate a further embodiment 2000, where the upper mount, drive gear, pivot and MACU system are integrated into an enclosed drive unit 2001 (replacing drive unit 1001).

A linear mast 2002 is rotatably captured between a lower mount 2003 and the integrated drive unit 2001 securing the top and bottom of the mast 2002 to the main mount post 20. The lower portion of the mast 2002 is provided with a pivot shaft which is received into a thrust bearing received in a bearing seat within the lower pivot mount 2003. The shaft is formed as part of and end cap 2005 for the mast 2002. The end cap 2005 may include an outer shroud portion 2007 which overlaps the bearing seat portion of the lower mount 2003 to protect the bearing seat from the ingress of rain, snow and water. The bearing seat of the lower mount 2003 may also include a lip seal for protecting the bearing for weather resistance.

The upper mount may comprise a fully integrated support and rotational drive unit 2001 including a housing 2004 which is clamped to the main mount post 20. In the illustrated embodiment, the drive housing 2004 is secured with fasteners that extend through a clamp 2008 and through facing web portions of the drive housing 2004 to capture the post 20 therebetween.

Turning to FIGS. 38-42, contained within the drive housing 1004 is a main drive hub 2010 which is rotatably mounted on upper and lower bearing sets 2012 between the housing 2004 and the mount body cover 2014. The main drive hub 2010 includes a shaped drive post 2016 which extends through one of the bearings 2012 and through an opening in the cover 2014 where it receives the upper end of the mast 2002. The upper portion of the mast 2002 is keyed to the shaped post 2016 on the drive hub 2010 by its internal extruded shape geometry, or alternatively the hub may have a complementary shape which receives and captures the external surface of the mast (see earlier FIG. 19).

The main drive hub 2010 is keyed to a planetary gear 2018 which is mated with a corresponding worm gear 2024 rotatably mounted on a drive axle and seat system 2050 permanently formed as part of the housing 2004. The drive axle system includes an axle 2050*a* and spaced bearings 2050*b* which are received into spaced bearing seats, the lower portions 2050*c* of which are formed as part of the housing 2004. The bearings 2050*b* are captured by upper bearing caps 2050*d* fastened to the lower portions 2050*c*. This arrangement allows for the worm gear 2024 to be mated with the planetary gear 2018 once it is press fit into its own bearings in the housing 2004. The worm gear drive ratio may be 50-1 or 60-1 or other appropriate self-locking gear ratio to provide a self-locking gear assembly with either near-zero or zero backlash.

In the present integrated drive unit, the MACU includes a servo drive motor 2052 with its own integrated planetary gear reduction between about 100-1 to 400-1. In some embodiments, the gear reduction may be about 250-1. The servo motor 2052 configuration with a high planetary gear reduction is advantageous because it provides an effective brake on the worm gear 2024 further improving the self-locking aspect of the worm gear assembly without the application of voltage on the motor 2052.

The motor 2052 is mounted to its own carrier 2053 and secured within the housing 2004 and coupled to the worm gear drive axle 2050*a* with an axial coupler 2054. This allows the motor 2052 and carrier 2053 to be placed into the housing 2004 and slid into place with the worm gear 2024 already engaged with the planetary gear 2018.

The motor 2052 is controlled by a controller 2056 (See FIG. 37) which is contained within a separate cavity on the lower side of the housing 2004. The controller may be AISG compatible, or may be compatible with other serial command protocols, such as an AT command set, or both such command sets may be included.

A cover 2055 is received over the cavity. End stop positions are sensed by a magnetic position sensor arrangement integrated with the drive hub 2010. Rotational position sensing between the end stops is provided by a multichannel encoder 2058 integrated with the motor and motor drive shaft.

In the end stop arrangement, a hall sensor 2060 contains an internal magnet and Hall effect sensor mounted in a twin tower configuration. An arcuate ferrous target vane 2062 of predetermined arc length is secured to the drive gear 2018. The target vane 2062 is sized for a particular arc length corresponding to the desired rotational drive extent of the antenna 102. In the present embodiment, the target vane 2062 is mounted on top of the planetary gear 2018 so that it can be more easily accessed from above and directly through the cover 2014. This arrangement provides the ability to more easily change the target vane 2062 with another of a different size. As the drive hub 2010 rotates with rotation of the motor 2052 and worm 2024, the target vane 2062 passes between the tower gap in the sensor 2060, and when a respective end of the target vane 2062 passes the Hall sensor 2060, the magnetic field is interrupted, and switches the digital state of the sensor to signal end of travel extent. As noted above, rotational position between the end stops 2062A,B is measured by the motor multichannel encoder 2058 which counts pulses between the opposing end stops 2062A,B.

The controller includes male and female M16 8 Pin DIN bidirectional serial ports 2020, 2022 as previously described (AISG C485 compatible). An antenna 102 assembled with the mount 2000 may utilize its own ACU units designated previously as 104. All of the motor controllers may be serially connected as described above and capable of serial interconnected communication using the AISG protocol and appropriate AISG compatible cables (not shown for clarity) .). Non-AISG command protocol, such as serial AT command sets may also be implemented using the same serial bus and cable connections. These generic serial commands allow the system to be utilized in other non-ASIG environments or with non-AISG control systems.

The antenna 102 is mounted to the mast 2002 and rotation of the mast 2002 is driven and controlled in a similar manner as noted above with earlier described embodiments.

Like the masts above, the mast 2002 is adaptable in size (length as well as width and depth) for different size antennas 102 and can be universally adapted for connection to different antennas using different adapter connections. The mast 2002 is further provided with longitudinal mounting channels to universally receive a variety of different accessories at any location on any surface of the mast 2002. This is particularly suitable for mounting cable stays, EMI shielding, RF shielding, etc. in appropriate locations along the mast 2002.

A lower pivot bracket may be secured to the lower portion of the mast 2002 as described hereinabove.

The downtilt linear actuator assembly 2032 (MTCU) (replaces actuator 1032 above) is pivotably secured at one end to an upper pivot bracket on the upper portion of the mast 2002 and at the other end to the upper antenna interface bracket. The actuator 2032 includes a main body portion 2036 which houses a threaded drive rod 2038 which may have a thread pitch of about 8-1 to 20-1 or higher. In the present exemplary embodiment, the thread pitch is 10-1. Similar to the worm gear self-locking arrangement, the higher thread pitch provides a stable self-locking actuator which will resist vibration and movement. The threaded drive rod 2038 is driven by a servo drive motor 2044 with a planetary gear reduction between 50-1 to 300-1. In the present embodiment, the thread pitch is 10-1 and the gear reduction is 100-1. The servo motor configuration with a high planetary gear reduction is advantageous because it provides an effective brake on the threaded drive rod 2038 further improving the self-locking aspect of the assembly without the application of voltage on the motor 2044.

The threaded drive rod 2038 is rotatably coupled to a threaded drive nut 2046 (lead nut) which is part of a piston 2040. The terminal end of the piston 2040 extends from the housing 2036 and includes a pivot head which is pivotably secured to the mounting bracket on the upper end of the antenna 102. The upper end of the piston includes a guide body 2040*a* (brass). Rotation of the threaded rod 2038 extends the piston 2040 from the housing 2036 to create elongation or extension of the unit 2032 and resulting downtilt of the antenna 102 relative to the mast 2002.

Figure 49:
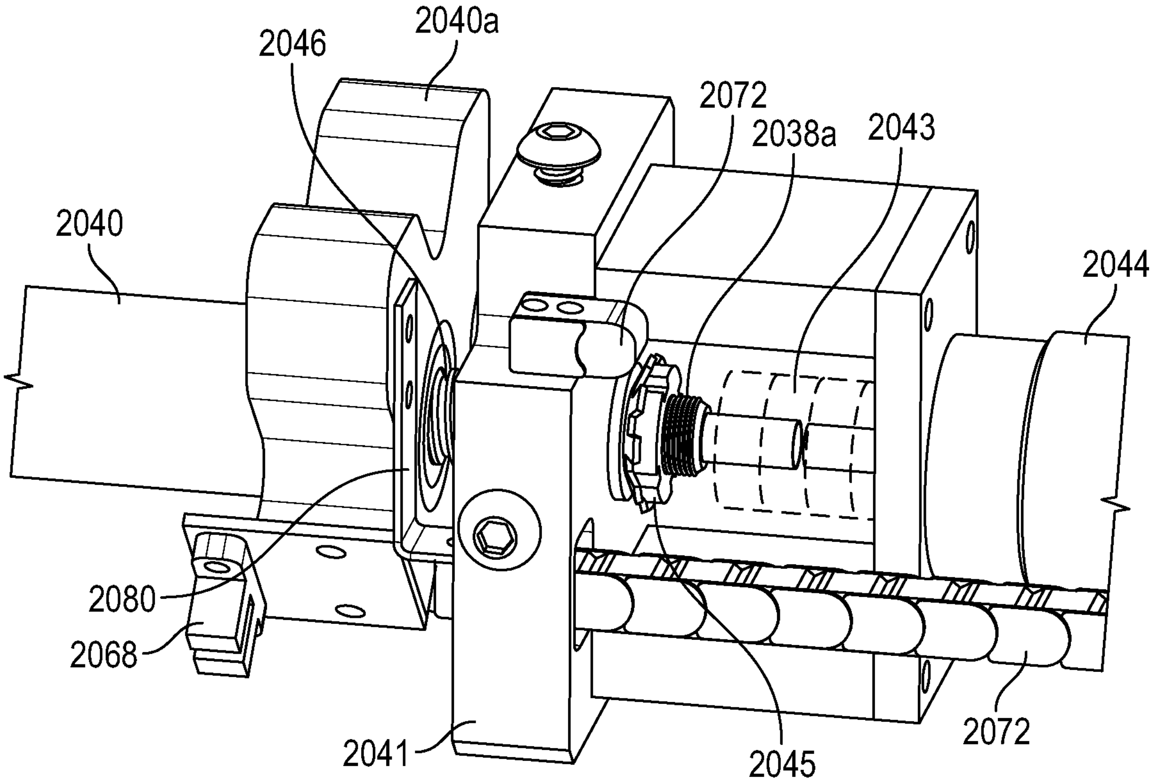

The motor 2044 is secured on a motor bulkhead 2041 secured within the interior extended profile of the housing 2036 and is coupled to the threaded rod 2038 by a suitable drive coupler 2043. The upper end 2038A threaded rod 2038 passes through the bulkhead 2041 and is also rotatably captured within the bulkhead 2041 by a threaded retaining nut 2045 and lock washer to provide improved axial load capabilities in the event of excessive force pulling on the piston system during high winds (See FIG. 49).

The motor 2044 is controlled by an AISG compatible motor controller (MTCU) 2064. similar to the MACU, and end stop position is sensed by a magnetic position sensor arrangement integrated with the housing 2036 and piston 2040. Interim position sensing between the end stops is provided by a multichannel encoder 2066 integrated with the motor.

Figure 47:
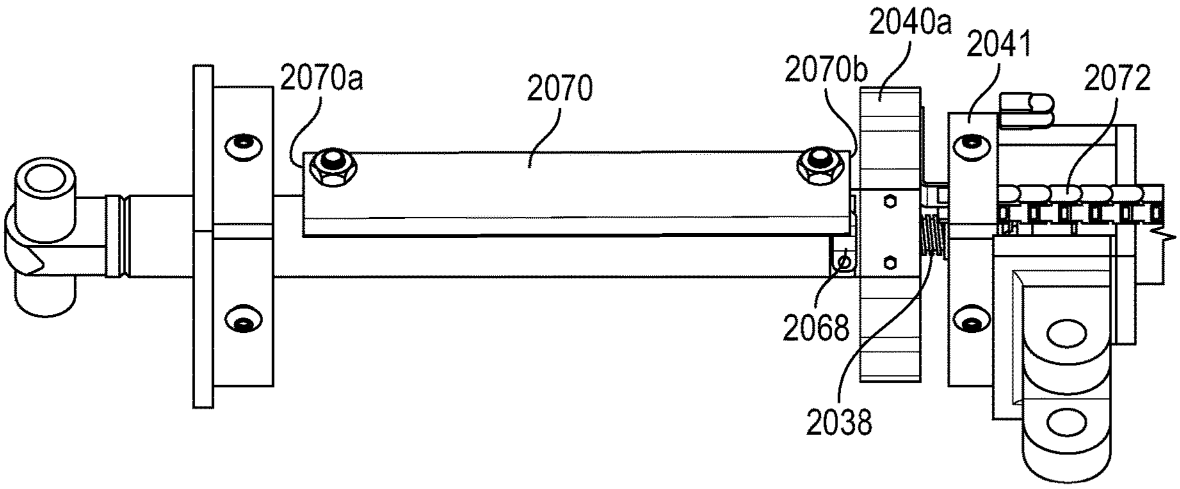
Figure 48:
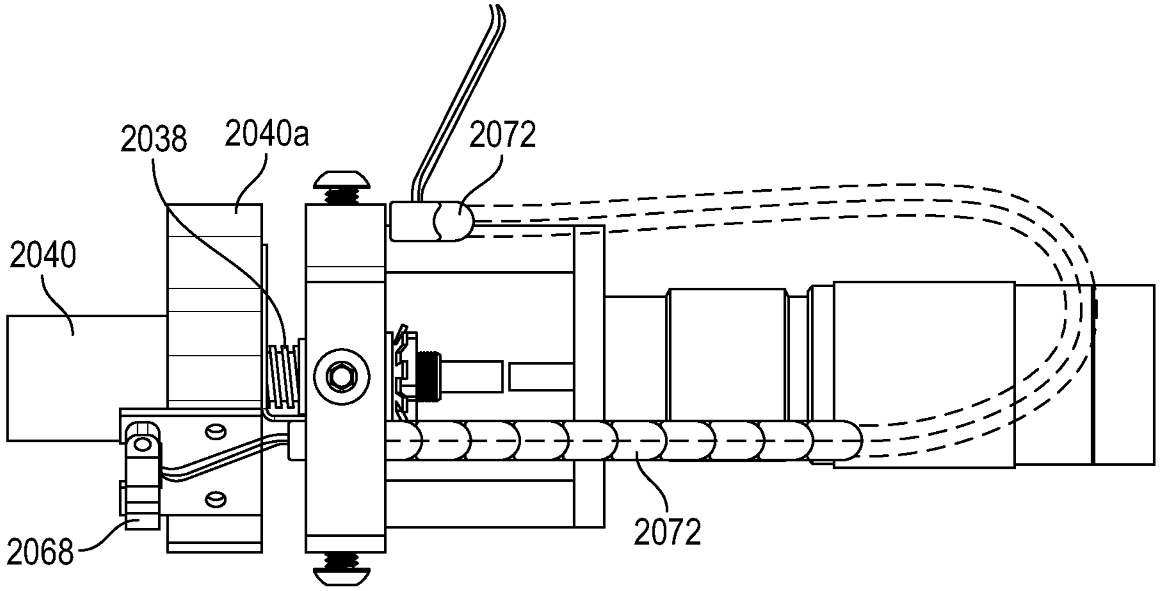

In the end stop arrangement, a hall sensor 2068 is mounted to the piston guide 2040*a* and contains an internal magnet and Hall effect sensor mounted in a twin tower configuration. A ferrous target vane 2070 is linear in shape and secured longitudinally on the inside wall of the housing 2036. This arrangement brings both the hall sensor 2068 and the target vane 2070 inside the housing for environmental protection. The target vane length is sized for a particular linear travel distance corresponding to the desired extension of the piston 2040 corresponding to a desired downtilt angle of the antenna 102. As the piston 2040 extends, the hall sensor 2068 travels with the piston along the target vane 2070 in a reverse scenario to earlier embodiment 1000. In this case, the sensor 2068 is moving rather than the target vane 2070. However, the overall effect is the same. When the sensor 2068 reaches the ends 2070A,B of the target vane (FIG. 47), the magnetic field is interrupted, and switches the digital state of the sensor for input to the controller to de-energize the motor. In order to provide for wire management of the sensor leads during movement, a chain link cable management guide 2072 is secured between the piston guide head 2040*a* (see bracket 2080 FIGS. 48-49) and the motor bulkhead (a portion of the guide is not shown for clarity of the underlying structures). As the piston 2040 drives in and out, the wire management guide moves along with the piston and manages movement of the sensor wires to prevent tangling.

As noted above, the top of the antenna 102 is secured to the pivoting head on the piston rod 2040. The linear outward extension of the piston 2040 pushes the top end of the antenna 102 outwardly to provide a controlled downtilt of the antenna 102 similar to the previous embodiments. Reverse motion draws the piston 2040 in and returns the antenna to its 0 degree upright position.

In cases where a negative tilt (uptilt) may be desired, the upper mount arm may be shortened and the piston elongated so that most inward retracted position of the piston represents a negative (antenna pointing upward) tilt.

FIGS. 50-55 illustrate a further embodiment of the mount assembly 3000 including an alignment spine 3100 to maintain relative alignment of the upper and lower mount assemblies during installation. Due to the upper and lower mount assemblies being separate entities and the requirement that the upper and lower pivot points of the antenna mast be aligned along all axes for proper jam free rotation, it is important that the upper and lower mount assemblies are properly aligned with each other when secured to the mount pole or otherwise mounted to a support structure, such as the side of a building.

Figure 50:
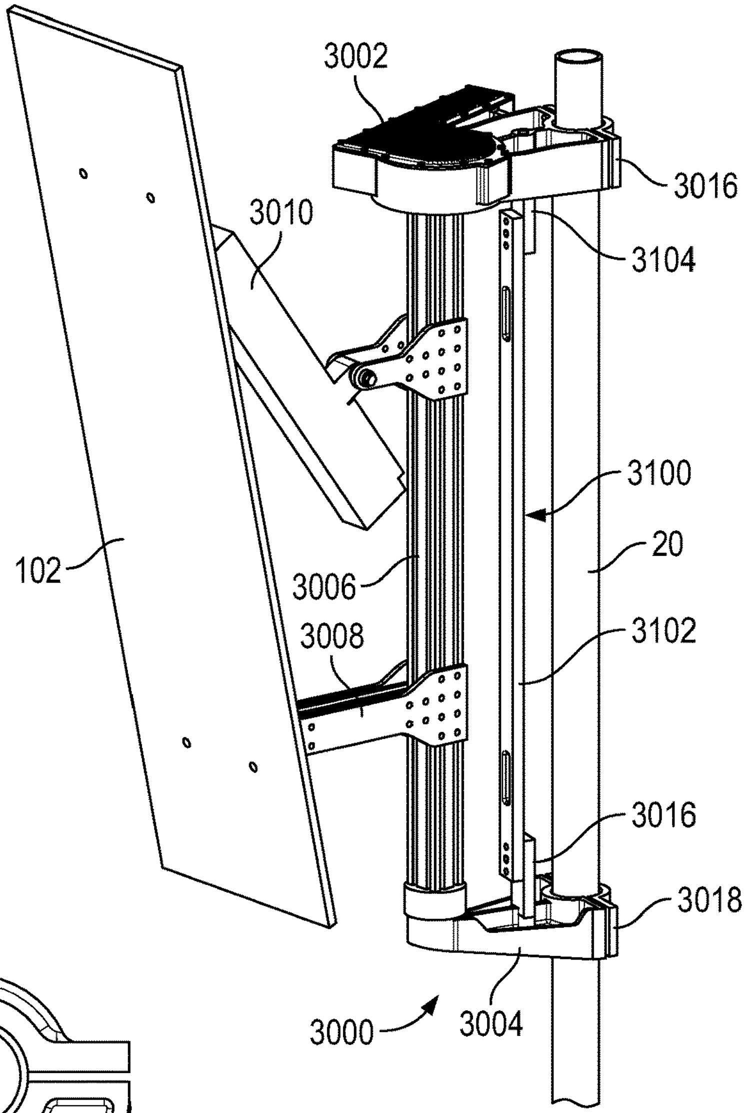
FIGS. 50-55 illustrate an embodiment of the invention including a removable alignment spine for maintaining alignment of the upper and lower mounts during installation.

As seen in FIG. 50, a mount assembly 3000 for mounting an antenna 102 to a mount pole 20 comprises an upper mount 3002, a lower mount 3004, a mast 3006 rotatably mounted between the upper and lower mounts, and an alignment spine 3100 extending between the upper and lower mounts. As will hereinafter be more fully described, the upper mount 3002, the lower mount 3004 and the alignment spine 3100 having interfitting locking surfaces in X, Y and Z axes whereby the upper mount, the lower mount and the mast are retained in vertical longitudinal alignment. The illustrated embodiment includes a lower antenna bracket 3008 and an upper downtilt actuator 3010 for connecting the antenna 102 to the mast 3006. However, it should be understood that other arrangements for connecting the antenna to the mast are contemplated.

Figure 51:
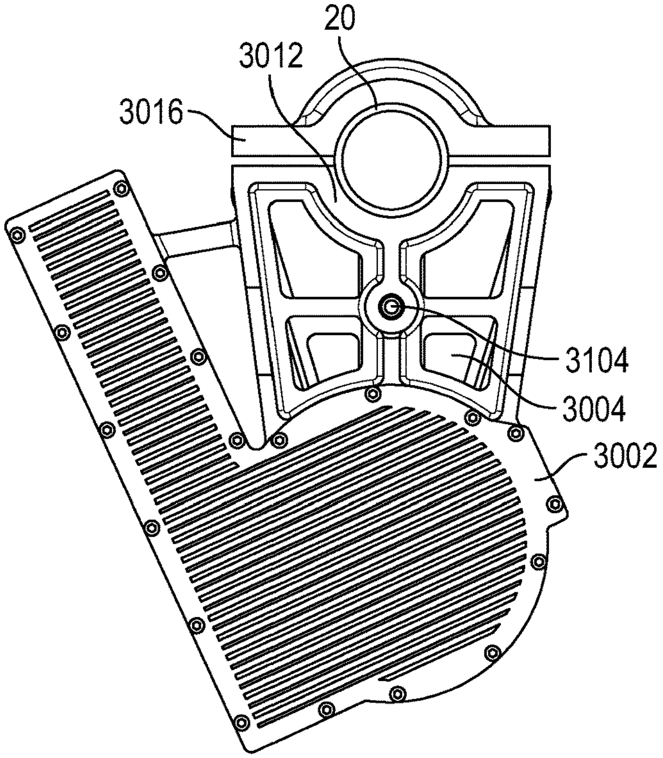

FIG. 51 illustrates a top view of the mount assembly 3000 showing vertical longitudinal alignment of the upper and lower mounts 3002, 3004 and the spine 3100 as it extends through the upper and lower mounts, as well as aligned orientation of structure engaging surfaces 3012, 3014 of the upper and lower mounts with the mount pole 20. In a post mount configuration the structure engaging surfaces are the arcuate clamp surfaces at the rear of the mounts and the mounts are secured to the post with mating clamp brackets 3016, 3018.

Figure 52:
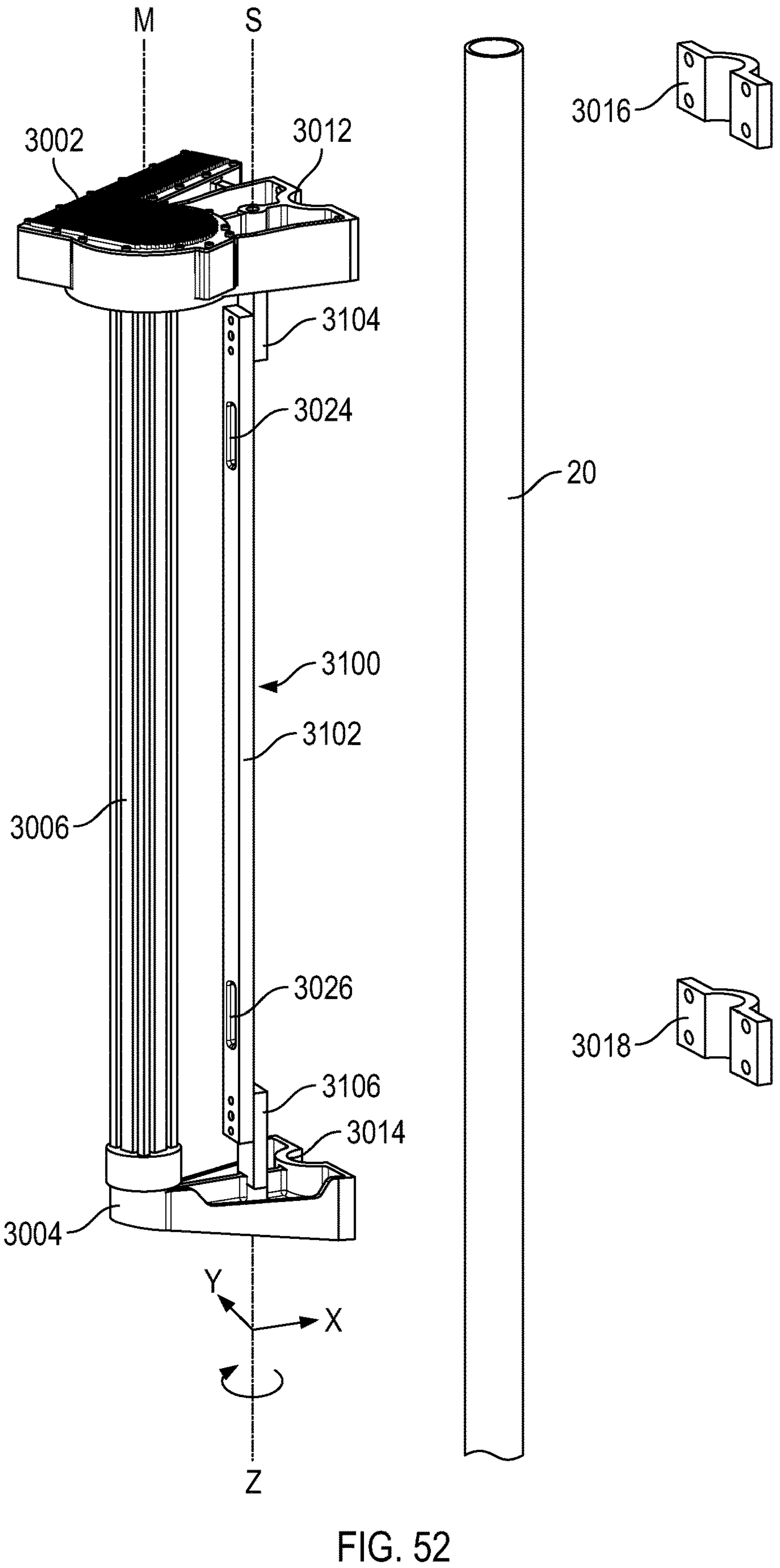

As best illustrated in FIG. 52, the spine 3100 is secured between the upper and lower mounts 3002, 3004 along a longitudinal spine axis (S) which runs parallel to the longitudinal mast axis (M). As noted above, the alignment spine 3100 maintains the upper and lower mounts in alignment along X, Y and Z axes with the Z axis representing the spine axis (S). More specifically, the spine 3100 maintains the structure engaging surfaces 3012, 3014 of the mounts in alignment during installation. It is intended that the spine 3100 is a temporary structure installed at the time of manufacture and shipped with the mount assembly to maintain the components in alignment, and that once the mount assembly is installed in place, the spine may be removed and recycled or returned for reuse.

Figure 53:
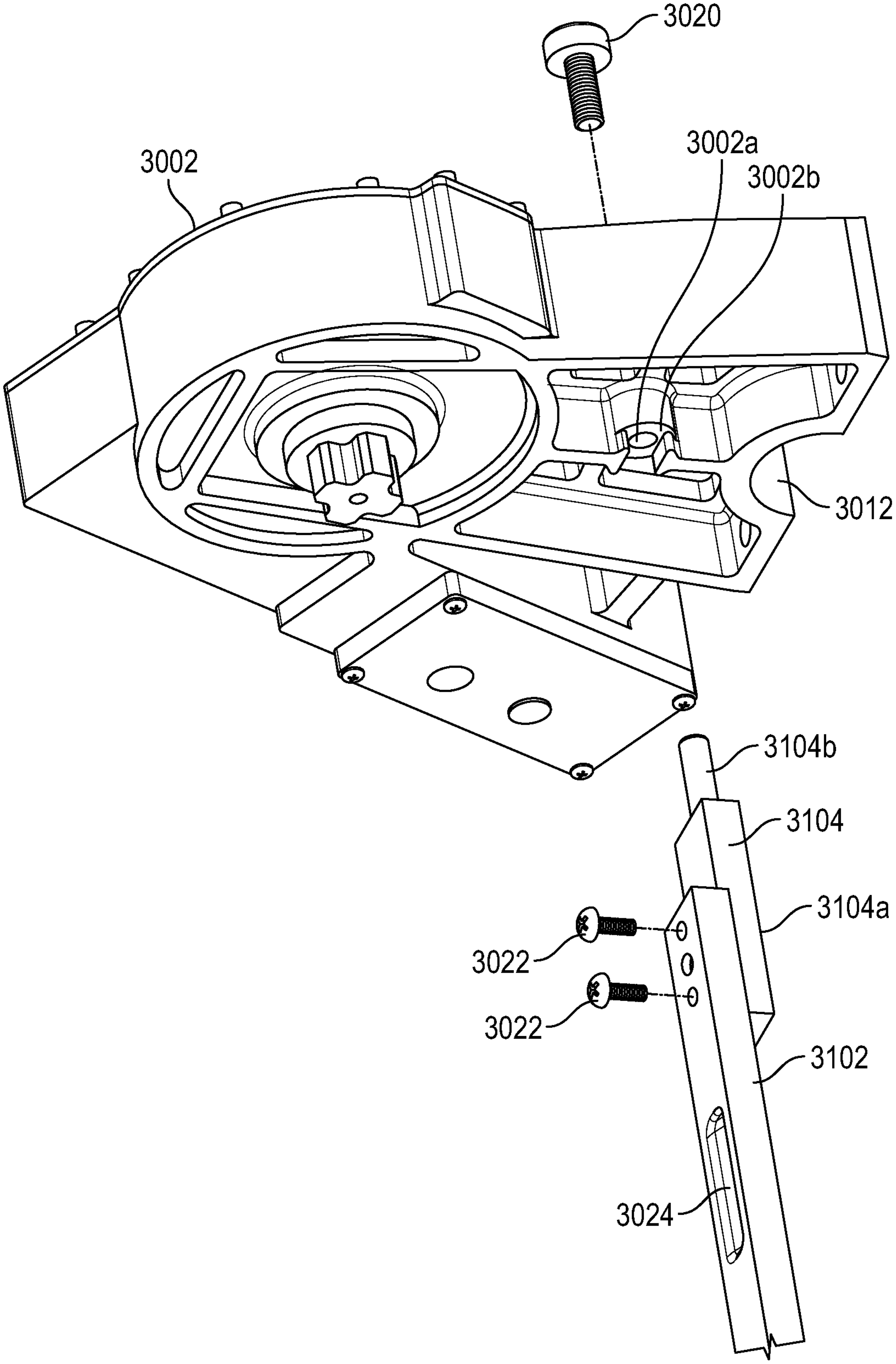
Figure 54:
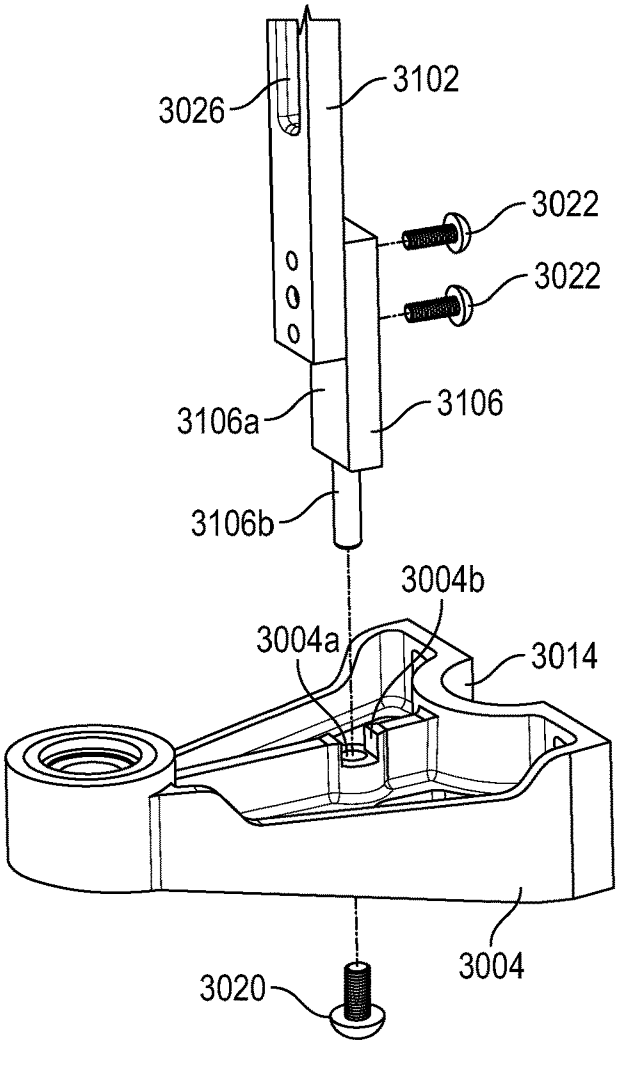
Figure 55:
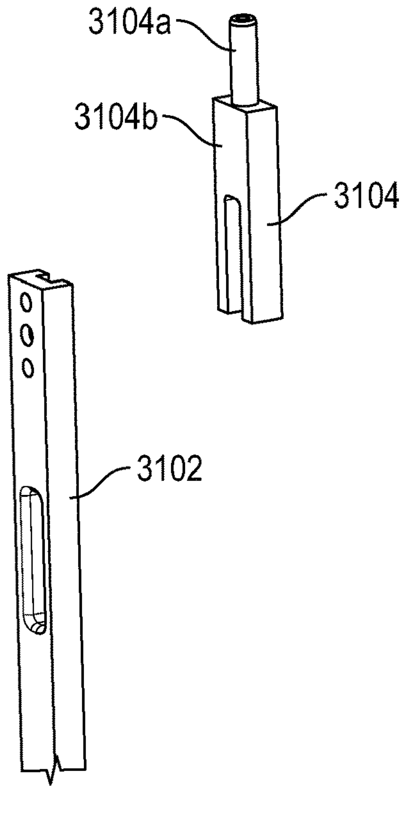

Turning to FIGS. 53-55, the alignment spine 3100 comprises a central spine bar 3102, an upper spine key 3104, and a lower spine key 3106. The upper spine key 3104 is removably secured to the upper mount 3002 and to an upper portion of the central spine bar 3102 and the lower spine key 3106 is removably secured to the lower mount 3004 and to a lower portion of the central spine bar 3102. The interfitting locking surfaces comprise longitudinally aligned passages 3002*a*, 3004*a* in the upper mount 3002 and the lower mount 3304 for receiving the upper and lower spine keys 3104, 3106. The passages 3002*a*, 3004*a* extend along the spine axis S. More specifically, the longitudinally aligned passages 3002*a*, 3004*a* in the upper and lower mounts are cylindrical and the interfitting locking surfaces further comprise rectangular seats 3002*b*, 3004*b* within upper and lower mounts at the facing entrances to the aligned passages 3002*a*, 3004*a*. On the spine keys 3104, 3106, the interfitting locking surfaces further comprise rectangular body surfaces 3104*a*, 3106*a* and a cylindrical post 3104*b*, 3106*b* which respectively interfit within the rectangular seats and cylindrical passages within the upper and lower mounts 3002, 3004. The upper and lower spine keys 3104, 3106 are secured axially to the mount bodies 3002, 3004 by fasteners 3020 which are received through the passages and into the cylindrical posts 3104*b*, 3106*b* of the spine keys. These fasteners 3020 are removable. The spine keys 3104, 3106 are secured to the central spine bar 3102 by additional fasteners 3022 which extend perpendicularly through the spine keys and bar. Once interfit and locked in position with the fasteners, relative movement of the upper and lower mounts 3002, 3004 is prevented in all three axes X, Y and Z along with preventing rotation of the mounts around the Z axis (see FIG. 52).

To facilitate installation, the alignment spine 3100 may include an upper opening 3024 for receiving a lifting implement, such as a hook, strap, chain or rope and may further include a lower opening 3026 for receiving a guide implement such as a hook, strap, chain or rope. In this manner the mount assembly 3000 and antenna 102 can be lifted in an assembled condition by the spine 3100 reducing stress on the functional components of the system. Once in position, the user may use the spine 3100 as a hand hold to guide the mount assembly 3000 into place onto the mount post 20 without having to worry about maintaining alignment. The spine 3100 will maintain the arcuate engagement surfaces 3012, 3014 in alignment for perfect mating with the mount post 20 and allow securement of the clamps 3016, 3018 with relative ease.

Once installed the fasteners 3020, 3022 can be removed and the alignment spine components removed.

It can therefore be seen that the exemplary embodiments provide a remotely controllable antenna mount is particularly useful with a wireless telecommunication antenna to provide mechanical azimuth and/or tilt adjustment using AISG compatible motor control units and AISG control and monitoring systems to remotely adjust the physical orientation of the antenna.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An actuator assembly for remote positioning of a wireless telecommunication antenna comprising:
 a mast;
 an antenna mounting bracket;
 a lower pivot assembly including a bearing receiving a lower end of said mast, and
 an upper rotational drive assembly comprising
  a housing,
  a drive hub rotatably mounted in the housing and extending through a bottom of said housing to receive an upper end of said mast,
  a reversible motor associated with the drive hub to drive rotation of the drive hub and the mast;
  a rotational end of travel sensor associated with the drive hub, said sensor detecting respective rotational end of travel positions; and
  a position encoder associated with the motor shaft and configured to detect rotations of the motor shaft when said drive hub is rotating between the rotational end of travel positions; and
 a motor controller associated with the motor, the sensor and the encoder for selectively driving rotation of the drive hub to predetermined rotational positions between the rotational end of travel positions.

2. The actuator assembly of claim 1 wherein said rotational end of travel sensor comprises an arcuate magnetic target vane associated with said drive hub and a hall sensor mounted within the housing.

3. The actuator assembly of claim 1 wherein said motor is removably secured within the housing.

4. The actuator assembly of claim 1 wherein said antenna mounting bracket comprises upper and lower brackets.

5. The actuator assembly of claim 1 wherein the bearing is a thrust bearing.

6. The actuator assembly of claim 1 wherein a lower end of the mast includes an end cap having a shroud.

7. The actuator assembly of claim 1 wherein the drive hub includes a shaped drive post which is keyed to an internal extruded shape geometry of the mast.

8. The actuator assembly of claim 1 wherein the motor controller is mounted to a cover which is removably secured to the housing of the drive assembly.

9. The actuator assembly of claim 1 wherein the motor controller is AISG compatible.

10. The actuator assembly of claim 2 wherein the target vane is removably secured to the drive hub.

11. The actuator assembly of claim 10 wherein the target vane is mounted adjacent a top surface of the drive hub.

12. The actuator assembly of claim 8 wherein the motor controller cover is removably mounted to a bottom of the housing.

13. An actuator assembly for remote positioning of a wireless telecommunication antenna comprising:
 a mast;
 a lower pivoting bracket arm secured to the mast and configured to be pivotably secured to an antenna; and
 an upper downtilt drive assembly comprising:
  a housing pivotably secured to said mast;
  a piston arm mounted in the housing and having a distal end extending through said housing, said distal end being configured to pivotably secure to said antenna;
  a drive nut at a proximal end of the piston arm;
  a threaded drive rod rotatably mounted within said housing and engaged for rotation with the drive nut;
  a reversible motor mounted within the housing and configured to reversibly drive said threaded drive rod and linearly actuate the engaged piston arm between a retracted position and an extended position;
  a linear end of travel sensor associated with the piston arm, said sensor detecting respective linear end of travel positions; and
  a position encoder associated with the motor shaft and configured to detect rotations of the motor shaft when said piston arm is actuated between the respective linear end of travel positions; and
  a motor controller associated with the motor, the end of travel sensor and the encoder for selectively driving linear extension and retraction of the piston arm to predetermined angular downtilt positions between said end of travel positions.

14. The actuator assembly of claim 13 wherein said linear end of travel sensor comprises:
 a linear target vane mounted longitudinally within said housing; and
 a sensor positioned on the piston arm and configured to detect presence of the target vane when said piston arm is linearly actuated between the linear end of travel positions.

15. The actuator assembly of claim 14 wherein said sensor is a hall sensor and said target vane is a magnetic material.

16. The actuator assembly of claim 14 wherein the sensor is mounted on the drive nut.

17. The actuator assembly of claim 14 further comprising a chain link wire guide wherein wires from the sensor are enclosed within the chain guide.

18. The actuator assembly of claim 14 wherein the drive assembly comprises a motor bulkhead and the proximal end of the threaded rod is rotatably captured in and extends through the bulkhead.

19. The actuator assembly of claim 18 further comprising a chain link wire guide wherein the sensor is mounted on the drive nut, the chain link wire guide extends through the bulkhead and wires from the sensor are enclosed within the chain guide.

20. The actuator assembly of claim 15 wherein the drive assembly comprises a motor bulkhead and the proximal end of the threaded rod is rotatably captured in and extends through the bulkhead.

21. The actuator assembly of claim 20 further comprising a chain link wire guide wherein the sensor is mounted on the drive nut, the chain link wire guide extends through the bulkhead and wires from the sensor are enclosed within the chain guide.

* * * * *